(12) United States Patent
Chowdhury et al.

(10) Patent No.: US 11,090,615 B2
(45) Date of Patent: Aug. 17, 2021

(54) SMOOTH POLYMER MEMBRANES AND ELECTROSPRAY PRINTING METHODS OF MAKING THEREOF

(71) Applicant: University of Connecticut, Farmington, CT (US)

(72) Inventors: Maqsud R. Chowdhury, Willimantic, CT (US); Jeffrey R. McCutcheon, Tolland, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 62 days.

(21) Appl. No.: 16/048,240

(22) Filed: Jul. 28, 2018

(65) Prior Publication Data

US 2019/0030493 A1    Jan. 31, 2019

Related U.S. Application Data

(60) Provisional application No. 62/358,503, filed on Jul. 28, 2017.

(51) Int. Cl.

| | | |
|---|---|---|
| *B01D 69/12* | (2006.01) | |
| *B01D 67/00* | (2006.01) | |
| *B01D 69/02* | (2006.01) | |
| *B01D 71/56* | (2006.01) | |

(Continued)

(52) U.S. Cl.
CPC ....... *B01D 69/125* (2013.01); *B01D 67/0006* (2013.01); *B01D 69/02* (2013.01); *B01D 71/56* (2013.01); *C02F 1/441* (2013.01); *B01D 61/025* (2013.01); *B01D 2315/08* (2013.01); *B01D 2323/26* (2013.01); *B01D 2323/35* (2013.01); *B01D 2325/04* (2013.01); *B01D 2325/06* (2013.01); *B01D 2325/20* (2013.01)

(58) Field of Classification Search
None
See application file for complete search history.

(56) References Cited

U.S. PATENT DOCUMENTS

| | | | |
|---|---|---|---|
| 1,958,406 A | | 5/1934 | Darrah |
| 3,662,046 A | * | 5/1972 | Woo .................. B01D 69/06 264/41 |
| 3,744,642 A | | 7/1973 | Scala et al. |

(Continued)

FOREIGN PATENT DOCUMENTS

CN    109647221 A    4/2019

OTHER PUBLICATIONS

Gu et al. ("Molecular Layer-by-Layer Assembled Thin-Film Composite Membranes for Water Desalination", Advanced Materials, 2013, 25, 4778-4782). (Year: 2013).*

(Continued)

*Primary Examiner* — Clare M Perrin
(74) *Attorney, Agent, or Firm* — Michael Best & Friedrich LLP

(57) ABSTRACT

A method of making a polymer membrane, the method including providing a first monomer solution having a first solvent, a second monomer solution having a second solvent, and a substrate having a surface, and including electrospraying the first monomer solution onto the substrate surface and electrospraying the second monomer solution onto the substrate surface to form the polymer membrane on at least a portion of the substrate surface.

15 Claims, 23 Drawing Sheets

(51) Int. Cl.
C02F 1/44 (2006.01)
B01D 61/02 (2006.01)

(56) References Cited

U.S. PATENT DOCUMENTS

| | | | |
|---|---|---|---|
| 4,039,440 | A | 8/1977 | Cadotte |
| 4,277,344 | A | 7/1981 | Cadotte |
| 4,748,043 | A | 5/1988 | Seaver et al. |
| 4,769,148 | A | 9/1988 | Fibiger et al. |
| 6,162,358 | A * | 12/2000 | Li ................... B01D 69/125 210/490 |
| 7,727,434 | B2 | 6/2010 | Kniajanski et al. |
| 9,211,507 | B2 | 12/2015 | Kim et al. |
| 9,302,922 | B2 | 4/2016 | Diallo et al. |
| 10,058,822 | B2 | 8/2018 | Diallo et al. |
| 2013/0292325 | A1 | 11/2013 | Yoo et al. |
| 2015/0352501 | A1 | 12/2015 | Ko et al. |
| 2016/0214069 | A1 | 7/2016 | Ding et al. |
| 2018/0311623 | A1 | 11/2018 | Okabe et al. |
| 2019/0046934 | A1 | 2/2019 | Diallo et al. |

OTHER PUBLICATIONS

Yung et al. ("Fabrication of thin-film nanofibrous composite membranes by interfacial polymerization using ionic liquids as additives", Journal of Membrane Science, 2010, 365, 52-58. (Year: 2010).*
Baig et al. ("Synthesis and characterization of thin film nanocomposite membranesincorporated with surface functionalized Silicon nanoparticles forimproved water vapor permeation performance", Chemical Engineering Journal, 2017, 308, 27-39: available online Sep. 9, 2016). (Year: 2016).*
Arena et al., "Surface modification of thin film composite membrane support layers with polydopamine: Enabling use of reverse osmosis membranes in pressure retarded osmosis." J. Memb. Sci., 2011; 375:55-62.
Baig et al., "Synthesis and characterization of thin film nanocomposite membranes incorporated with surface functionalized Silicon nanoparticles for improved water vapor permeation performance." Chemical Engineering Journal, 2017; 308: 27-39.
Bosse et al., "Error-corrected AFM: a simple and broadly applicable approach for substantially improving AFM image accuracy" Nanotechnology, 2014; 25(15): 155704, 1-9.
Bui et al., "Hydrophilic Nanofibers as New Supports for Thin Film Composite Membranes for Engineered Osmosis." Environ. Sci. Technol., 2013; 47:1761-1769.
Bui et al., "Electrospun nanofiber supported thin film composite membranes for engineered osmosis." Journal of Membrane Science, 2011; 385-386:10-19.
Cadotte et al., "A new thin-film composite seawater reverse osmosis membrane." Desalination, 1980; 32:25-31.
Choi et al., "Thin film composite reverse osmosis membranes prepared via layered interfacial polymerization," J. Memb. Sci. 527, 121-128 (2017).
Colton et al., "Mass Transfer to a Rotating Fluid Part II. Transport from the Base of an Agitated Cylindrical Tank," AIChE J. 18, 958-967 (1972).
Elimelech et al.,"The Future of Seawater and the Environment: Energy, Technology, and the Environment," Science, 333, 712-718 (2011).
Fenn et al., "Electrospray ionization for mass spectrometry of large biomolecules," Science. 246, 64-71 (1989).
Fenn et al., "Electrospray ionization-principles and practice," Mass Spectrom. Rev. 9, 37-70 (1990).
Freger, "Nanoscale heterogeneity of polyamide membranes formed by interfacial polymerization," Langmuir. 19, 4791-4797 (2003).
Freger, "Swelling and Morphology of the Skin Layer of Polyamide Composite Membranes: An Atomic Force Microscopy Study," Environ. Sci. Technol. 38, 3168-3175 (2004).

Gañán et al., "Current and droplet size in the electrospraying of liquids. Scaling laws," J. Aerosol Sci. 28, 249-275 (1997).
Gaskell, "Electrospray : Principles and Practice," J. Mass Spectrom. 32, 677-688 (1997).
Geise et al., "Water permeability and water/salt selectivity tradeoff in polymers for desalination," J. Memb. Sci. 369, 130-138 (2011).
Gekas et al., "Mass transfer in the membrane concentration polarization layer under turbulent cross flow I. Critical literature review and adaptation of existing sherwood correlations to membrane operations," J. Memb. Sci. 30, 153-170 (1987).
Ghosh et al., "Impacts of support membrane structure and chemistry on polyamide—polysulfone interfacial composite membranes," J. Memb. Sci. 336, 140-148 (2009).
Gray et al., "Internal concentration polarization in forward osmosis: role of membrane orientation," Desalination. 197, 1-8 (2006).
Gu et al., "Molecular layer-by-layer assembled thin-film composite membranes for water desalination," Adv Mater. 2013;25(34):4778-82.
Henderson et al., "Ionic liquids enable electrospray ionisation mass spectrometry in hexane," Chem. Commun., 2872-2874 (2006).
Hwang et al., "Production of uniform-sized polymer core-shell microcapsules by coaxial electrospraying," Langmuir. 24, 2446-51 (2008).
Jaworek et al., "Electrospraying route to nanotechnology: An overview," J. Electrostat. 66, 197-219 (2008).
Jaworek, "Micro- and nanoparticle production by electrospraying," Powder Technol. 176, 18-35 (2007).
Karan et al., "Sub-10 nm polyamide nanofilms with ultrafast solvent transport for molecular separation," Science. 348, 1347-1351 (2015).
Khawaji et al., "Advances in seawater desalination technologies," Desalination. 221, 47-69 (2008).
Koyuncu et al., "A comparison of vertical scanning interferometry (VSI) and atomic force microscopy (AFM) for characterizing membrane surface topography," J. Memb. Sci. 278, 410-417 (2006).
Lee et al., "A review of reverse osmosis membrane materials for desalination—Development to date and future potential," J. Membrane Science, 2011; 370:1-22.
Ma et al., "Interfacial Polymerization with Electrosprayed Microdroplets: Toward Controllable and Ultrathin Polyamide Membranes," Environ. Sci. Technol. Lett., 2018; 5(2): 117-12.
Ma et al., "Nanofoaming of Polyamide Desalination Membranes to Tune Permeability and Selectivity," Environ. Sci. Technol. Lett. 5, 123-130 (2018).
Morgan et al., "Interfacial Polycondensation. II. Fundamentals of Polymer Formation at Liquid Interfaces," J. Polym. Sci. XL, 299-327 (1959).
Morota et al., "Poly(ethylene oxide) thin films produced by electrospray deposition: Morphology control and additive affects of alcohols on nanostructure," J. Colloid Interface Sci. 279, 484-492 (2004).
Mulder, "Basic Principles of Membrane Technology," Springer Netherlands, ed. 2nd, 1996, 12 pages.
Mundo et al., "Droplet-Wall collisions: Experimental studies of the deformation and breakup process," Int. J. Multiph. Flow. 21, 151-173 (1995).
Park et al., "Fabrication of polyamide thin film composite reverse osmosis membranes via support-free interfacial polymerization," J. Memb. Sci. 526, 52-59 (2017).
Park et al., "High-resolution electrohydrodynamic jet printing," Nat. Mater. 6, 782-789 (2007).
Park et al., "Maximizing the right stuff: The trade-off between membrane permeability and selectivity," Science. 356, 1137-1148 (2017).
Peterson, "Composite reverse osmosis and nanofiltration membranes." Journal of Membrane Science, 1993, 83(1) 81-150.
Rietveld et al., "Electrospray deposition producing ultra-thin polymer films with a regular surface structure," Soft Matter. 5, 593-598 (2009).
Saf et al., "Thin organic films by atmospheric-pressure ion deposition," Nat. Mater. 3, 323-329 (2004).
Sakata et al., "Preparation of organic thin films by an electrospray technique I. Crystal forms and their orientation in poly(vinylidene flouride) films," Thin Solid Films. 195, 175-184 (1991).

(56) References Cited

OTHER PUBLICATIONS

Salata, "Tools of Nanotechnology: Electrospray," Curr. Nanosci. 1, 25-33 (2005).

Song et al., "Ultra-thin, multi-layered polyamide membranes: Synthesis and characterization," J. Memb. Sci., 2017; 29 pages. doi.org/10.1016/j.memsci.2017.06.016.

Tang et al., "Effect of membrane chemistry and coating layer on physiochemical properties of thin film composite polyamide RO and NF membranes. I. FTIR and XPS characterization of polyamide and coating layer chemistry," Desalination. 242, 149-167 (2009).

Tang et al., Probing the nano- and micro-scales of reverse osmosis membranes—A comprehensive characterization of physiochemical properties of uncoated and coated membranes by XPS, TEM, ATR-FTIR, and streaming potential measurements. J. Memb. Sci. 287, 146-156 (2007).

Tsuru et al., "Multilayered polyamide membranes by spray-assisted 2-step interfacial polymerization for increased performance of trimesoyl chloride (TMC)/m-phenylenediamine (MPD)-derived polyamide membranes," J. Memb. Sci. 446, 504-512 (2013).

Wilm, "Principles of electrospray ionization," Mol. Cell. Proteomics, 2011; 10(7):1-8.

Zhao et al., "Enhancement of the performance of organic solar cells by electrospray deposition with optimal solvent system," Solar Energy Materials and Solar Cells, 2014; 121: 119-125.

International Search Report and Written Opinion for Application No. PCT/US2018/44262 dated Nov. 29, 2018, 16 pages.

\* cited by examiner

US 11,090,615 B2

SMOOTH POLYMER MEMBRANES AND ELECTROSPRAY PRINTING METHODS OF MAKING THEREOF

CROSS-REFERENCE TO RELATED APPLICATIONS

This application claims priority to U.S. Provisional Patent Application No. 62/538,503, filed on Jul. 28, 2017, the contents of which are incorporated herein by reference.

STATEMENT REGARDING FEDERALLY SPONSORED RESEARCH OR DEVELOPMENT

This invention was made with government support under grant number RD834872 awarded by the U.S. Environmental Protection Agency. The government has certain rights in the invention.

BACKGROUND OF THE INVENTION

In membrane based desalination processes, the thin film composite (TFC) membrane is an industry standard, which is made using an interfacial polymerization technique to form an ultrathin polymer (e.g. polyamide) layer on the surface of polymeric substrates. In 30 years of using this approach, the reverse osmosis (RO) industry has yet to create a polyamide film onto a supporting membrane such that the film has controllable thickness, controllable roughness, and other properties that are independent from the substrate properties. The reaction for film formation in the known art proceeds in an uncontrolled manner.

Thickness and roughness impact membrane permeance and fouling propensity, respectively, and being able to carefully control these parameters could greatly benefit any process that uses a TFC membrane.

SUMMARY OF THE INVENTION

The disclosure contained herein is in the general field of polymer thin films and methods of making and using those thin films.

In one embodiment, the invention provides a method of making a polymer membrane, the method including providing a first monomer solution having a first solvent, a second monomer solution having a second solvent, and a substrate having a surface, and including electrospraying the first monomer solution onto the substrate surface and electrospraying the second monomer solution onto the substrate surface to form the polymer membrane on at least a portion of the substrate surface.

In another embodiment, the invention provides a thin film composite membrane, the thin film composite membrane including a polymer, and where the thin film composite membrane has a smoothness characterized by an RMS roughness value of less than or equal to about 45 nm.

In yet another embodiment, the invention provides a desalination system including a thin film composite membrane attached to a porous substrate, the thin film composite membrane including a polymer, and where the thin film composite membrane has a smoothness characterized by an RMS (root mean squared) roughness value of less than or equal to about 45 nm.

Other aspects of the invention will become apparent by consideration of the detailed description and accompanying drawings.

DETAILED DESCRIPTION

Figure 1:
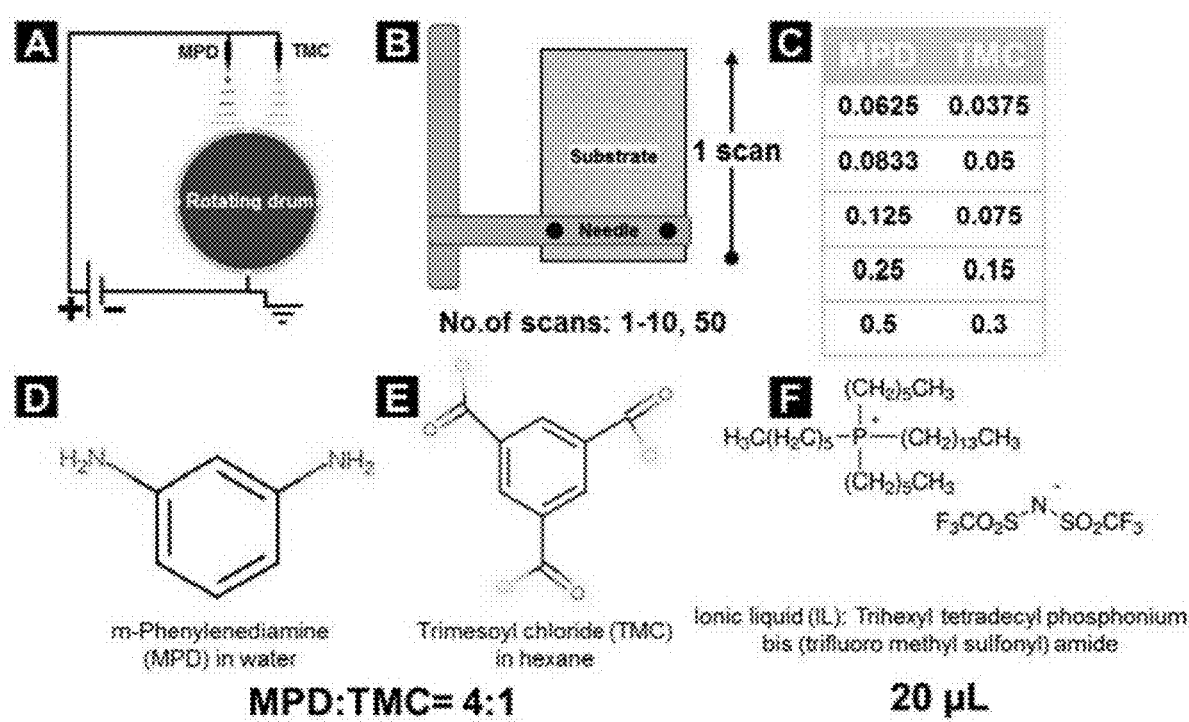
FIG. 1 shows a schematic diagram of an electrospray polymerization (ESP) system and a recipe for making tunable polyamide films using electrosprayed polymerization. (A) a side view of the ESP system with two needles placed vertically; (B) a top down view of the ESP system demonstrating a single scan; (C) the amount of m-phenylene diamine (MPD) and trimesoyl chloride (TMC) monomers used (wt/vol of solvent); (D) an MPD monomer; (E) a TMC monomer; (F) the chemical structure of an ionic liquid (IL) suitable for the organic phase.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In one aspect, disclosed herein are new methods for making TFC membranes using electrospray polymerization. This additive approach may involve depositing m-phenylene diamine (in aqueous phase) and trimesoyl chloride (in organic phase) monomers sequentially onto a porous supporting surface such that the monomers form an ultrathin, highly selective, and tunable polyamide layer.

In another aspect, disclosed herein is the use of electrospray to form polyamide selective layers with adjustable thickness and roughness while decoupling the film formation from the structural and chemical properties of the supporting substrate. For example, demonstrated herein is the ability to control thickness with a resolution of 20 nm or less and/or to control RMS roughness between 3.5 nm and 35 nm, which is comparable to the molecular layer by layer (m-LBL) technique.

In yet another aspect, disclosed are advantages resulting from making polyamide selective layer formation "support independent" by ensuring that support layer properties do not affect film formation. Using the disclosed approach, TFC membranes have been fabricated on PAN50 ultrafiltration (UF) membranes (Nanostone Water). These membranes have demonstrated a 66% to 97% and 80% to 98.7% rejection for sodium chloride and magnesium sulfate, respectively, with pure water permeance ranging from 0.1 to 0.75 liters per square meter per hour per bar (LMH/bar). It is an object of the disclosed approach and methods to enable further tuning of monomer concentration performance of TFC membranes.

In yet another aspect, disclosed are free-standing (i.e. not connected to a substrate) polymer (e.g. polyamide) films having a thickness greater than 1 µm. These relatively bulky films are capable of being used in a variety of characterization techniques that have been difficult to perform on commercial membranes. The characterization techniques are useful for studying structure-property relationships, among other things. For example, the free-standing films are able to be characterized by EDX, allowing for a better and faster measurement of bulk polymer composition.

Definitions

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and," and "the" include plural references unless the context clearly dictates otherwise. The present disclosure also contemplates other embodiments "comprising," "consisting of," and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrase "at least one of A, B, . . . and N" or "at least one of A, B, . . . N, or combinations thereof" are defined in the broadest sense to mean one or more elements selected from the group comprising A, B, . . . and N, that is to say, any combination of one or more elements A, B, . . . or N including any one element alone or in combination with one or more of the other elements, which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Chemical compounds are described using standard nomenclature. For example, any position not substituted by any indicated group is understood to have its valency filled by a bond as indicated, or a by hydrogen atom.

Unless otherwise indicated the term, "substituted" as used herein means replacement of one or more hydrogens with one or more substituents. Suitable substituents include, for example, hydroxyl, $C_6$-$C_{12}$ aryl, $C_3$-$C_{20}$ cycloalkyl, $C_1$-$C_{20}$ alkyl, halogen, $C_1$-$C_{20}$ alkoxy, $C_1$-$C_{20}$ alkylthio, $C_1$-$C_{20}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, amido, or carbamoyl.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl, as well as bridged or caged saturated ring groups such as norbornane or adamantane.

As used herein "haloalkyl" indicates both branched and straight-chain alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, etboxy, n-propoxy, i-propoxy, o-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Haloalkoxy" indicates a haloalkyl group as defined above attached through an oxygen bridge.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5- to 7-membered saturated cyclic group that optionally contains 1 or 2 heteroatoms independently chosen from N, O, and S, to form, for example, a 3,4-methylenedioxy-phenylgroup. Aryl groups include, for example, phenyl, naphthyl, including 1-naphthyl and 2-naphthyl, and bi-phenyl.

As used herein "heteroaryl" indicates aromatic groups containing carbon and one or more heteroatoms chosen from N, O, and S. Exemplary heteroaryls include oxazole, pyridine, pyrazole, thiophene, furan, isoquinoline, and the like. The heteroaryl groups may be substituted with one or more substituents.

As used herein, "halo" or "halogen" refers to fluoro, chloro, bromo, or iodo.

As used herein, "arylene" includes any divalent aromatic hydrocarbon or 2 or more aromatic hydrocarbons linked by a bond, a heteroatom (e.g., O, S, S(=O), S(=O)$_2$, etc.), a carbonyl group, an optionally substituted carbon chain, a carbon chain interrupted by a heteroatom, and the like.

As used herein, "attached" or "affixed" may include any physical or chemical means of direct or indirect connection. In certain contexts, the term indicates direct physical contact. In certain other contexts, the term indicates indirect physical contact. In yet other contexts, the term indicates direct and/or indirect physical contact.

Unless otherwise indicated, the term "RMS roughness" as used herein means root mean squared roughness. It can be measured using AFM. Roughness measurements are in length scale, which depicts how rough a particular surface is and averages roughness over the differences between the deepest and tallest points over the entire area of the surface.

Unless otherwise indicated, the term "m-LBL technique" as used herein means a molecular layer-by-layer approach for growing or making thin films. An ultra-thin layer of a substance (typically in the range of 0.2 nm to 2 nm) is deposited, formed, and grown on a suitable substrate. See, for example, Gu et al. in Advanced Materials. "Molecular layer-by-layer assembled thin-film composite membranes for water desalination" 2013, which is incorporated herein in its entirety.

Unless otherwise indicated, the term "TFC membrane" as used herein means a thin film composite membranes.

Unless otherwise indicated, the term "ESP" as used herein means electrospray polymerization. Unless otherwise indicated, the terms "electrospray polymerization," "electrospraying," and "electrospray printing" are used interchangeably herein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

Methods of Making Polymer Membranes

The disclosed methods allows for formation of a very thin, highly selective, and permeable film on the top of a porous supporting substrate. The methods may be easily scalable and may use substantially less chemicals than conventional methods. The methods are also capable of controlling the layer thickness and can greatly reduce membrane surface roughness in comparison to conventional interfacial polymerization. Thinner membranes can offer higher productivity membranes (permeance). Smoother membranes can offer superior fouling resistance for a variety of membrane processes.

The electro-sprayed polymerization methods described herein use an electric field to produce a fine mist of two (or more) solutions and deposit the aerosols on a substrate surface. The nanoscale size of the aerosols allows for high surface areas for reaction, thereby increasing reaction rates to allow for rapid and defect-free film formation on the substrate. The disclosed process may be very tunable with regard to controlling surface roughness and surface thickness. The process may be support-independent and may requires much lower volumes of monomer solutions.

Alternately, it is possible to electrospray a single polymer solution, instead of two monomer solutions. It is likewise possible to deposit a blend of miscible polymers, a self-assembled polymer, or a monomer solution including an polymerization initiator that activates upon deposition (e.g. a photoinitiator or a chemical initiator) from a single needle. For example, a polymer film including entrapped nanoparticles could be formed from a single polymer solution containing the nanoparticles.

The tunable thickness control is related to the concentrations of the solutions, as shown below. Lower solution concentrations are generally expected to allow for finer control of the thickness. The thickness is also determined by the number of layers (i.e. scans) of polymer formed. Similarly, roughness depends primarily on the solution concentration and number of layers. Lower concentrations typically produce smoother films—perhaps due to a lower heat of reaction causing less wrinkling during film formation—and fewer layers tend to result in smoother films.

The thickness and roughness can be independently controlled. For example, a few layers formed from high concentration monomer solutions can create a thick, rough film, whereas many layers formed from lower concentration monomer solutions can create a film of equal thickness but lower roughness.

In certain embodiments, the number of scans (i.e. layers) is between 1 and 10. In certain embodiments, the number of scans is greater than 1, 2, 3, 4, 5, 6, 7, 8, 9, or 10. In certain embodiments, the number of scans is less than 50, 40, 30, 20, 10, 9, 8, 7, 6, 5, 4, 3, or 2. In certain embodiments, the number of scans is 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, or greater than 100.

In certain embodiments, a thin polymer (e.g. polyamide) layer is formed onto a porous substrate using electrospraying. Two monomers, an acid chloride and a diamine for example, may be ejected from two adjacent needles that are charged by a high voltage power supply. Droplets of both monomers emerge from the needles and are propelled toward a collector surface by an electric field. The collector surface may be the porous substrate, or the porous substrate may be wrapped around the collector surface.

Additionally, the collector surface may be configured on a rotating cylinder and/or the surface material may comprise a porous material or membrane. The fast reaction between the two monomer solutions creates a polyamide film. In certain embodiments, there may be more than two monomers or the two monomers may be the same chemical compound.

The electrospraying methods form very fine droplets, which increase the overall surface area available for reaction and thereby increase the speed of the polymerization reaction. In certain embodiments, the disclosed methods enable uniform layer formation and tight control of the thickness of the polyamide layer.

A further advantage of the disclosed methods are that they may only require small volumes of monomer solutions and thereby make efficient use of starting materials. The disclosed methods may be easily scalable.

In certain aspects of disclosed technology, membrane manufacturers for water desalination, gas separations, and/or pervaporation can use this technique for formation of a very thin film of polyamide layer on top of a porous or dense support. The approach offers unprecedented control of polymer film thickness and roughness. In fact, this methodology can produce polyamide films that are a fraction of the roughness of conventional polyamide TFC membranes, for example.

In certain other embodiments, the disclosed technique is effective for coating conductive materials with a coating material. The coating material may include, but is not limited to, thin layers of robust polyamide, thin layers of another suitable polymer, conductive polymers, nanoparticles, carbon nanotubes, carbon nanomaterials (e.g. graphene or graphene oxide), other 2D nanomaterials, or other nanotubular materials.

For commercial desalination membranes, typical RMS roughness values are about 80 nm to about 100 nm. For the methods disclosed herein, observed roughness ranged from molecularly smooth to about 45 nm, which is markedly lower than the commercial membranes. In certain embodiments, the RMS roughness of the disclosed films may be less than about 80 nm, about 70 nm, about 60 nm, about 50 nm, about 45 nm, about 40 nm, about 35 nm, about 30 nm, about 25 nm, about 20 nm, about 15 nm, about 10 nm, about 10 nm, about 5 nm, about 4 nm, about 3 nm, about 2 nm, or approximately molecularly smooth.

The embodiments and examples disclosed herein describe exemplary materials that may be used in the disclosed methods to produce the disclosed membranes. There are number of different monomers that could be used for making TFC membranes for specific purposes. For example, piperazine as an amine source can be used with TMC to make polyamide membranes for making TFC membranes for nanofiltration. For reverse osmosis, MPD and TMC produce "best in class" performance with regard to pure water permeance and NaCl salt rejection. In general, any amine that can react to form a nylon (either aromatic or aliphatic) can be used in this fashion.

Other possible monomers and other materials that are adaptable to the process disclosed herein are described in K. P. Lee et al., J. Membrane Science, 2011, which is incorporated herein in its entirety. Suitable polymer materials for the disclosed membranes may include polyamide, aromatic polyamide, polypiperzine-amide, cellulose acetate, polybenzimidazoline, polyoxadiazole, polyfurane, polyetherpolyfurane, sulfonated polysulfone, polyamide via polyethylenimine, polyamide via polyepiamine, polyvinylamine, polypyrrolidine, polypiperazine-amide, cross linked fully aromatic polyamide, cross linked aralkyl polyamide, and substituted variants thereof. Suitable materials may also include copolymers, such as block copolymers. Suitable materials may also include self-assembled materials, such as di-block polymers or zwitterionic polymers.

Additionally, monomers can be deposited and then crosslinked with a chemical crosslinker (e.g. polyvinyl alcohol crosslinked with glutaraldehyde). A monomer can also be deposited and then crosslinked or polymerized with a secondary step (e.g. photopolymerization, provided a photoinitiator is also present).

It is an object of the disclosed technology that the ESP process will work on any substrate as long as the pore radius on the substrate is small enough to prevent either conformal coating within the pore or collapse of the film into the pore during operation of the membrane. For polyamide films intended for RO, this threshold pore size may be below 50 nm, though the threshold size may depend on various factors. For example, the threshold size may be larger for lower pressure applications of the membrane, such as nanofiltration or forward osmosis. Using the ESP methods as described herein, polymer can be coated on commercially available UF or microfiltration (MF) membrane substrate with exemplary results.

Additionally or alternately, the films can be formed directly on solid substrates, aiding in thin film characterization that may be difficult or impossible in an integrated TFC membrane. Solid substrates may include foils, such as aluminum, tin, copper, or gold foil.

Porous substrates useable with the disclosed methods include MF membranes, such as polymer MF membranes made with polyvinylidene fluoride (PVDF), nylon, polysulfone, polyethersulfone, polyacrylonitrile, polycarbonate, polybenzimidizoles, cellulosic polymeric materials, or combinations thereof. Other suitable porous substrates include, but are not limited to, UF membranes (e.g. polymer membranes, including those made with the polymers listed above), inorganic membranes (e.g. silica based substrates, siloxane based polymers, ceramics, glass, or metal membranes), fibrous membranes (nonwoven or woven membranes of suitable pore and fiber size), or combinations thereof.

In certain embodiments, the substrate may be non-porous. In certain embodiments, the membrane may be formed on one substrate and later affixed to a different substrate. For example, the polymer membrane may be formed on an aluminum substrate, then delaminated from the aluminum substrate, and affixed to another substrate (e.g. a silicon wafer). The polymer membrane may be detached from the aluminum substrate by submersing the foil into an aqueous solution containing NaOH, or another suitable solute.

While certain exemplary substrates have been described in the embodiments presented herein, a range of other substrates are also amenable to use with the disclosed methods. With regard to substrates, two kinds of polyacrylonitrile UF membrane—one with 75 kDa molecular weight cut-off (MWCO) and the other one with 225 kDa MWCO— have been tested. Both of these are hydrophilic. A polysulfone UF membrane with 20 k Da was also successfully tested, and it is hydrophobic.

While certain exemplary ratios of monomers and concentrations of monomers have been described in the embodiments presented herein, other monomer ratios are also amenable to use with the disclosed methods. In certain preferred embodiments, the inventors have tested the MPD concentration from 0.0625 to 0.5 wt/vol of solvent and TMC concentration from 0.0375 to 0.3 wt/vol of solvent.

In certain embodiments, the ratio of one monomer (e.g. MPD) to another monomer (e.g. TMC) may be greater than or equal to 1:2, 1:1, 2:1, 3:1, 4:1, 5:1, 10:1, 15:1, 20:1, or 25:1. In certain embodiments, said ratio may be less than or equal to 30:1, 25:1, 20:1, 15:1, 10:1, 5:1, 4:1, 3:1, or 2:1. For example, said ratio may be in the range from 1:1 to 30:1, from 1:1 to 5:1, or from 1:1 to 4:1. Said ratio may be about 4:1. In this context, "greater than" or "less than" refers to the first number in the ratio relative to the second number, such that 1:2 is less than 1:1, which is less than 2:1.

For certain applications, 2% MPD and 0.15% TMC is a suitable combination. The molar ratio of MPD:TMC may be from 4:1 to 1:4. In some embodiments, a range of MPD from 0.01% to 2% and TMC from 0.005% to 0.15% may be utilized in the ESP methods for membrane fabrication. Lower and higher concentrations are also possible, but higher concentrations of monomers are expected to yield less smooth films with somewhat less precise control of the thickness. There may be variation in the molar ratio of MPD:TMC.

Also disclosed are desalination systems including the films/membranes disclosed herein. Such a desalination system may demonstrate a pure water permeance in the range of about 0.1 LMH/bar to about 16 LMH/bar. In certain embodiments, the pure water permeance may range from about 1 to about 16, about 2 to about 16, about 3 to about 16, about 4 to about 16, about 5 to about 16, about 6 to about 16, about 7 to about 16, about 8 to about 16, about 9 to about 16, about 10 to about 16, about 11 to about 16, about 12 to about 16, about 13 to about 16, about 14 to about 16, or about 15 to about 16 LMH/bar. In certain embodiments, the pure water permeance may be greater than or equal to about 0.1, about 0.5, about 1, about 2, about 3, about 4, about 5, about 6, about 7, about 8, about 9, about 10, about 11, about 12, about 13, about 14, or about 15 LMH/bar.

Sources of materials used in the disclosed methods and the following examples may include: polyethylene terephthalate (PET) nonwoven (Novatexx 2442, Freudenberg, Weinheim Germany), m-phenylene diamine (MPD, >99%, Sigma Aldrich, St. Louis, Mo.), 1,3,5-benzenetricarbonyl trichloride (TMC, 98%), polyacrylonitrile (PAN, MW 150,000, Scientific Polymer Products, Ontario, N.Y.), N,N-dimethylformamide (DMF, >99.9%, Fisher Scientific, Fair Lawn, N.J.), hexane (HPLC grade, >99.9%, Fisher Scientific, Fair Lawn, N.J.), and/or UF membrane as support (Nanostone Water).

EXAMPLES

Demonstrated herein is the formation of a membrane using an ESP method and a system for producing such a membrane. Further details, variations, and embodiments of the methods, membranes, and systems disclosed herein are also described. This application also includes characterization and performance data for certain methods and membranes disclosed herein.

Example 1

Electro-Hydrodynamic Spray for TMC Membranes for Desalination

Figure 2:
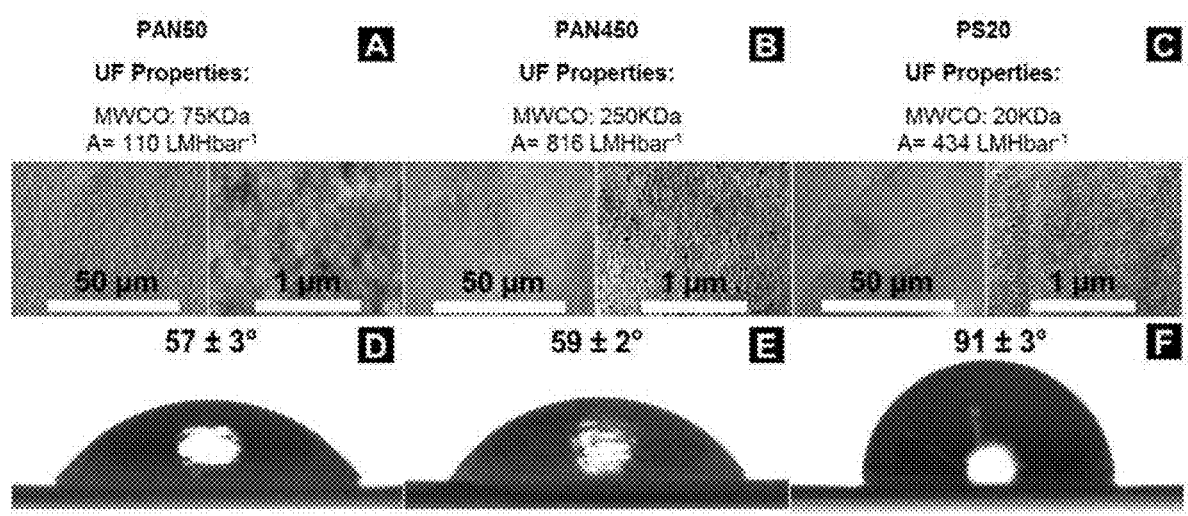
FIG. 2 shows properties of an ultrafiltration membrane according to the present disclosure. (A,B,C) the substrates used for these samples. (D,E,F) contact angles for the respective samples.

A diagram is presented in FIG. 1. A high voltage DC power source (Gamma High Voltage Research, Ormond Beach, Fla.) capable of generating 30 kV was connected to two stainless steel needles (26 gauge). The needles were hung from an L-shaped arm, which was attached to a stage as shown in FIG. 1. The distance between the two needles was kept at about 6 cm, and the distance between the needle tips and the rotating drum was kept below about 3 cm (though these distances are adjustable). The stage sat on a slider that was moveable horizontally using a stepper motor and a motor controller (Velmex, Bloomfield, N.Y.). The UF membranes (FIG. 2) were attached to an aluminum cylindrical rotating drum with a diameter of about 4 inches using tape. The drum was grounded to ensure a polarity and potential difference across the needle tips and drum.

Although a certain electrospraying system is presented in FIG. 1, many variations of this system are possible without deviating from the spirit of the invention. For example, the spray from a needle may be oriented top down, side to side, or bottom up, and rather than a slider, an immovable plate with moving needles, a belt with banks of needles, or some combination thereof may be used.

Multiple materials, moreover, can be deposited in sequence. For example, a nanomaterial can be "sandwiched" into a polyamide film by spraying 3 solutions from 3 different needles in sequence: MPD, the nanomaterial, and TMC. Similarly, layers of polyamide could be sprayed in between layers of a nanomaterial to form a layered structure.

Several different monomer concentrations of both MPD and TMC were studied, as listed in the following table. The MPD and TMC concentrations were chosen such that the MPD/TMC molar ratio remained at about 4:1. A 20 µL IL (FIG. 3F) was used in the TMC solution to increase its electrical conductivity.

| Test conditions | MPD conc. in water (wt/vol) | TMC conc. in hexane (wt/vol) |
| --- | --- | --- |
| 1 | 0.5 | 0.3 |
| 2 | 0.25 | 0.15 |
| 3 | 0.125 | 0.075 |
| 4 | 0.0833 | 0.05 |
| 5 | 0.0625 | 0.0375 |

Two monomer solutions of MPD and TMC were then fed into two separate needles using a syringe pump at a flowrate of 5 ml/hr and flexible tubing. Each syringe contained about 10 ml of solution. The cylindrical drum was then set to rotate at 20 rotations per minute (RPM). The high voltage DC power supply was set at 4 kV to 6 kV and was tuned each time to ensure a stable electrospray condition. A stable electrospraying condition refers to a cone-jet mode where the liquid is elongated into a long, fine jet that deposits straight onto the collector. When this occurred, solutions from both MPD and TMC needles spray deposited on to the UF membrane. As the drum was rotating clockwise (as shown in FIG. 1A) and as both needles were aligned horizontally (as shown in FIG. 1B), the TMC solution sprayed directly on top of the MPD solution sprayed about 300 msec earlier. Once a stable spray was formed, the stage holding the two needles was programmed to move horizontally at a velocity of 350 µm/sec using a Velmex controller. When the stage moved the complete length of the membrane horizontally, it was considered a single "scan." To demonstrate the idea of a 3-D printing approach with ESP, the number of scans was varied from 4, 5, and 10 scans. Once the ESP was done for the required number of scans, the TFC membrane was removed and stored for further characterization.

Figure 3:
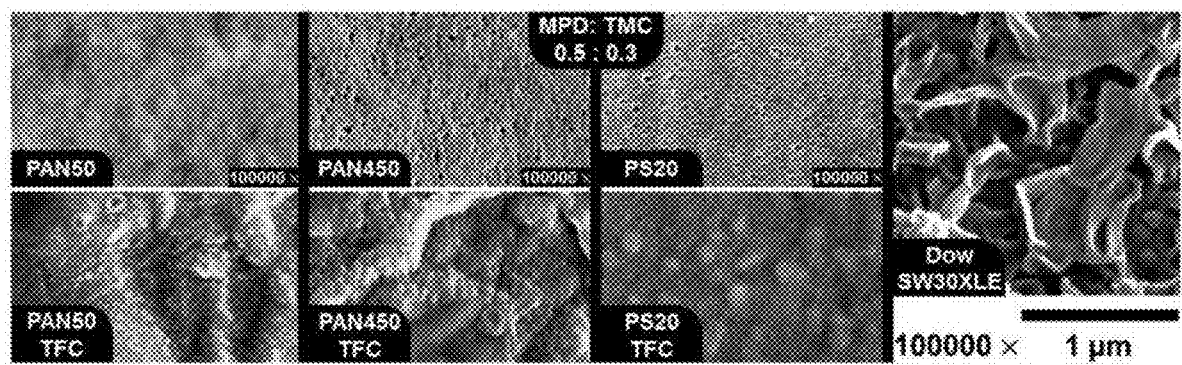
FIG. 3 shows a series of scanning electron microscopy (SEM) images of ESP TFC membranes for a MPD:TMC ratio of 0.5:0.3 (wt/vol of solvent) concentration for making TFC membranes on PAN50, PAN450, and PS20 substrate. A commercial membrane (Dow SW30XLE) is shown for comparison.

Polyamide formed via ESP was found to be significantly different from that made through conventional interfacial polymerization (IP) methods, which can be seen from SEM images depicting the surface morphology of PAN50, PAN450, and PS20 TFC membranes in FIG. 3. A smoother surface is observed, contrary to the ridge and valley like morphology as seen from the Dow SW30XLE membrane shown at the right.

Figure 4:
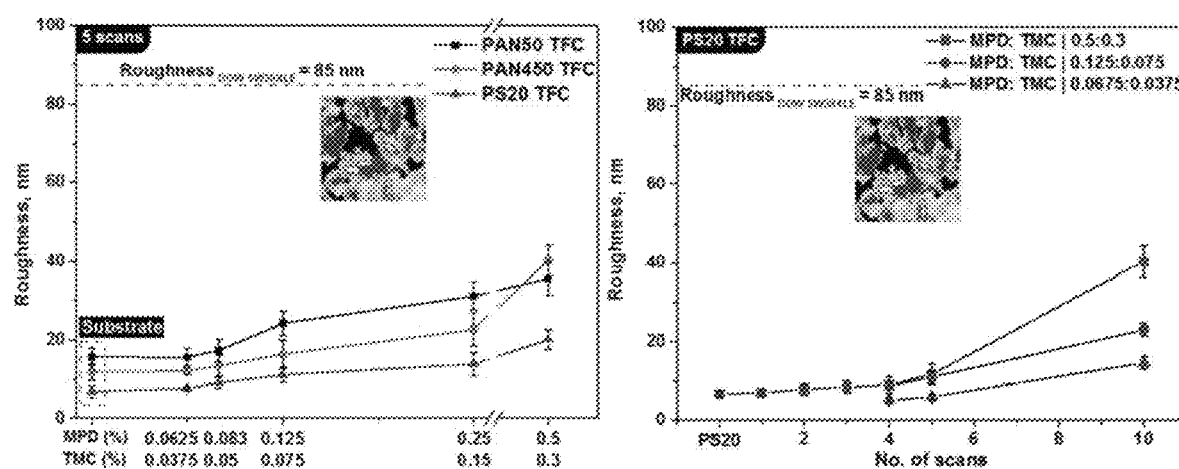
FIG. 4 shows AFM images and plots of changes in surface roughness with respect to MPD and TMC concentration (left) and number of scans performed on the substrate (right).

The surface roughness of the ESP TFC membranes are presented in FIG. 4. Molecularly smooth TFC membranes were manufactured at the lowest concentration of MPD and TMC, while membrane roughness increased with MPD and TMC loading across all the different substrates tested. Roughness also increased with the increase in number of scans, but the rate of increase in surface roughness decreased with decrease in MPD and TMC concentration. Compared to the Dow SW3OXLE membrane, ESP TFC membranes have markedly lower roughness.

Figure 5:
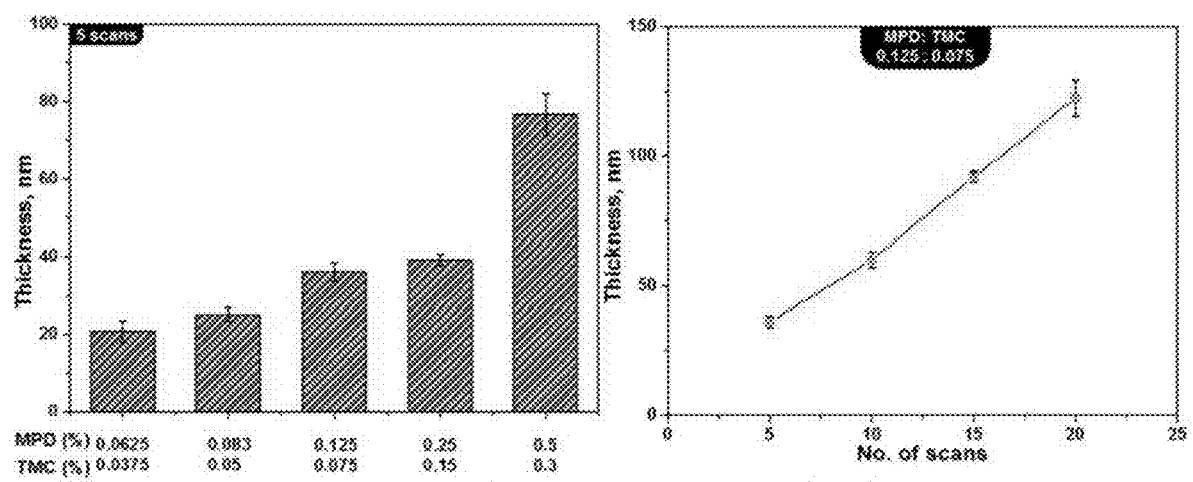
FIG. 5 shows changes in polyamide thickness with respect to MPD:TMC concentration (left) and number of scans (right).

The thickness of the polyamide film also plays an important role in determining the overall membrane performance. Demonstrated herein is control over film thickness, as evidenced by AFM and TEM. From FIG. 5, one can see that as the MPD and TMC concentration increases, the thickness of the polyamide also increases. A 4 nm/scan rate was achieved for lowest concentration of MPD and TMC, while a 15 nm/scan rate was observed for the 0.5:0.3| MPD:TMC concentration. Also evaluated were the changes in thickness with regard to the number of scans and the findings showed that the thickness changes linearly with increase in the number of scans.

Figure 6:
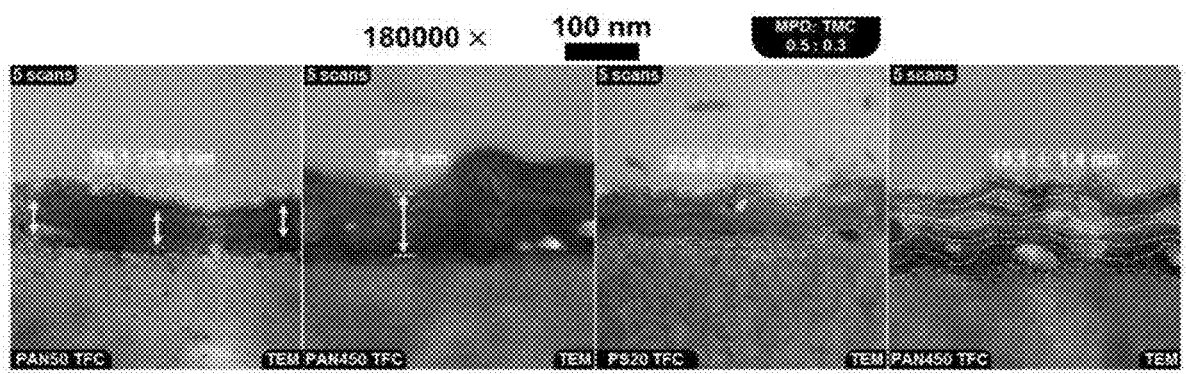
FIG. 6 shows TEM micrographs of polyamide films with PAN50 TFC and PAN450 TFC for 5 scans. The rightmost image shows 5 layers with a resolution of 15.1±1.4 nm. PAN stands for polyacrylonitrile.

To confirm the thickness, TEM was performed on the polyamide of an actual membrane, as shown in FIG. 6. Similar thickness for the PAN50 TFC, and PS20 TFC membrane for MPD:TMC loading of 0.5:0.3 was observed. For one such film, investigation revealed a 5 layer polyamide film with each layer having a thickness of 15.1±1.4 nm, which confirms findings from the AFM result and demonstrates the support independent film formation aspect of ESP as films with similar thickness were also found on aluminum foil.

Figure 7:
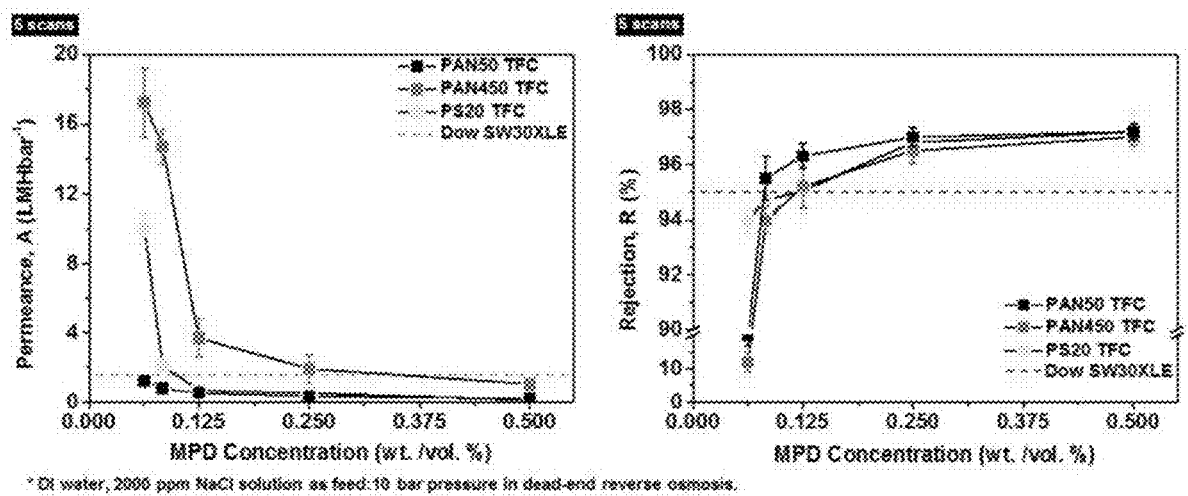
FIG. 7 shows desalination performance of ESP TFC membranes in a dead-end based reverse osmosis setup.
Figure 8:
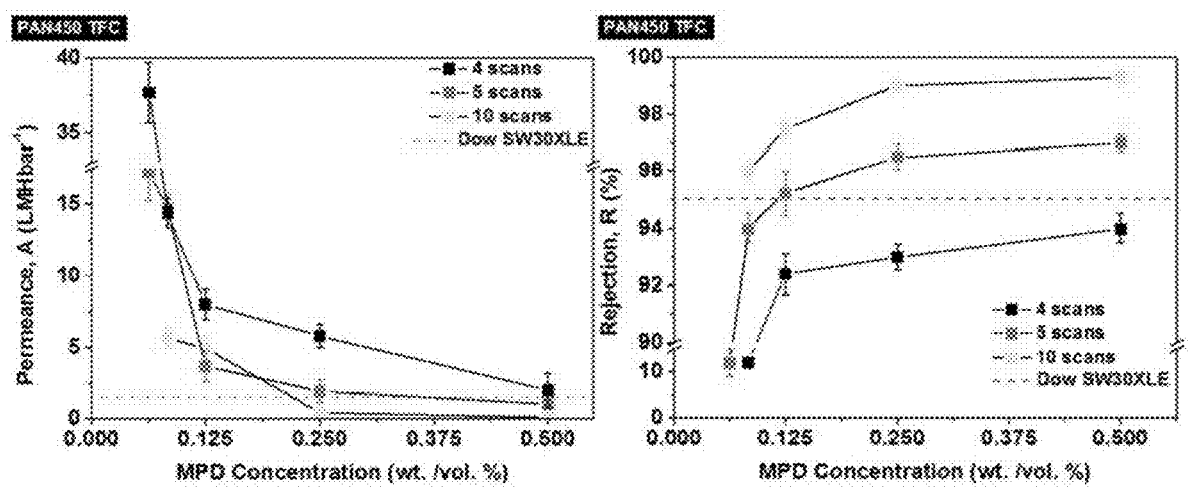
FIG. 8 shows desalination performance of ESP TFC membranes with regard to number of scans in a dead-end based reverse osmosis setup.

The desalination performance of ESP TFC membranes are presented in FIG. 7 and FIG. 8. From FIG. 7, it is seen that as the concentration of MPD and TMC increases, the pure water permeance decreases and salt rejection increases. This is seen across all the different substrates being used, with PAN450 TFC performing the best among these. Comparing these results with the result from Dow SW30XLE, it can be seen that some of these membrane were able to outperform the commercial membrane. From FIG. 8, the desalination performance with regard to the increase in number of scans can be seen. As the number of scans increases for a particular MPD:TMC concentration, the permeance decreases while the rejection increases. This is translated across all the concentrations that were used to make the TFC membrane. Without wanting to be limited by theory, the drastic change in permeance and rejection was due to the increase in thickness with higher scans and improving surface coverage and blocking defects. Comparing these results with the Dow SW30XLE, one can see very good rejection with 10 scans, while better overall permeance was achieved at the lowest concentration of MPD and TMC.

The above experiments demonstrate that by controlling polyamide thickness and roughness, one achieves a range of desalination performance. A molecularly smooth and 25 nm thick polyamide formed at the MPD:TMC concentration of 0.083:0.05 was able to match the desalination performance of the industry leading desalination membrane, Dow SW30XLE.

The disclosed methods with 0.5% MPD and 0.3% TMC showed the highest rejection with the lowest permeance among all the concentration combinations that were tested in this Example.

Production of membranes as disclosed herein was achieved using only a fraction of the volume of monomer solution that would be required in the conventional IP process. Said reduction may be as high as 95%. Therefore, the disclosed ESP methods provide a green alternative to conventional processes.

Example 2

3D Printed Polyamide Membranes for Desalination

In yet another example, polymer (e.g. polyamide) thickness and roughness have been identified as critical properties that impact thin film composite membrane performance for reverse osmosis. Conventional formation methodologies lack the ability to control these properties independently with high resolution or precision. An additive approach is presented which employs electrospraying to deposit monomers directly onto a substrate where they react to form a polymer (e.g. polyamide). Without wanting to be limited by theory, the small droplet size (see, for example, FIG. 12) coupled with low monomer concentrations result in polyamide films that are smoother and thinner than conventional polyamides, while the additive nature of the approach allows for control of thickness and roughness. Polyamide films are formed with a thickness that is controllable down to 4 nm increments and a roughness as low as 2 nm while still exhibiting good permselectivity relative to a commercial benchmarking membrane.

The TFC membrane has served as the desalination industry's standard membrane for over 30 years. During that time, this membrane has changed little. The composite structure comprises a polyester backing layer for mechanical support, a porous supporting polysulfone mid-layer cast through phase inversion, and an ultra-thin, highly crosslinked polyamide film that is dense enough to separate salt ions from water, but thin enough to have a low resistance to water transport. This polyamide layer is formed in-situ onto the porous mid-layer via interfacial polymerization. This approach relies on a reaction between an amine (e.g. MPD) in an aqueous phase and an acid chloride (e.g. TMC) in an organic phase. The immiscibility of the two phases permit the reaction to occur only at the phase boundary. Film growth is limited to the boundary and subsequently self-limits the reaction as reactants are blocked by the growing film. The result is a self-terminated, but uncontrolled, film growth with a thickness between about 100 nm to about 200 nm and a rough ridge and valley like surface morphology. While these membranes exhibit better permselectivity compared to any other commercial desalination membrane, certain features of the film properties and its fabrication procedure are inherently limiting. The intrinsic roughness of these films have been attributed to a high fouling propensity for reverse osmosis and nanofiltration processes. Additionally, the thickness of the membrane, which is proportional to its permeance, is essentially uncontrolled as the process simply self-terminates as the film forms. Lastly, the properties of the support layer surface, including pore size, pore spacing, surface porosity, and surface chemistry, impacts the interface between the two phases and thus the membrane performance in unpredictable ways.

A better polymer (e.g. polyamide) desalination membrane should have similar permselective properties as existing membranes, but also be tunable in each of these other properties. The thickness should be reduced to maximize permeance, while still ensuring that the films are sufficiently robust to withstand necessary hydraulic pressures. The roughness should be minimized to lessen the likelihood that the membrane will foul and also improve cleaning efficiency. Lastly, the film properties should be decoupled from the substrate properties, allowing these selective films to be deployed on any type of substrate.

To better control thickness and roughness, others have proposed methods that are complex and that are unlikely to scale easily for commercial production.

Figure 9:
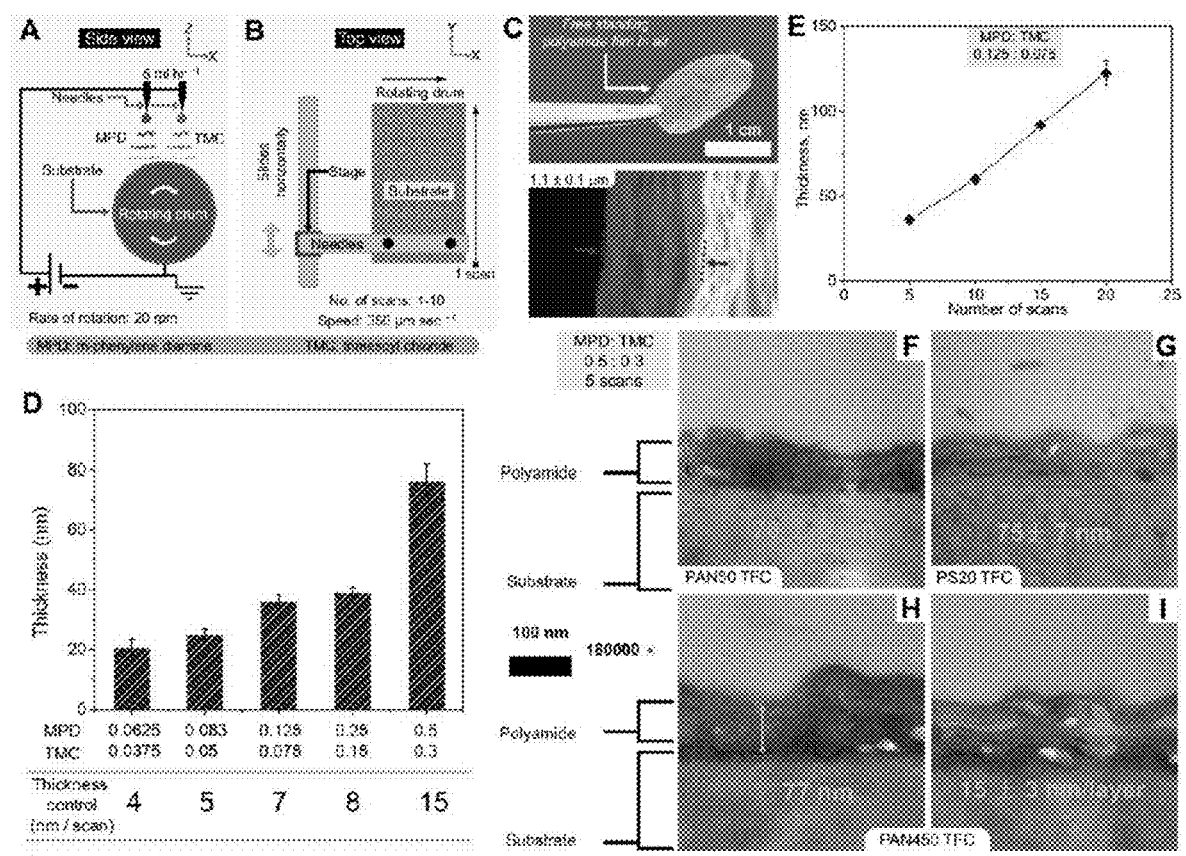
FIG. 9 shows details of an electrospray process for printing substrate independent polyamide films with sub-4 nm thickness control. (A) A side view of a schematic of an electrospray process according to the present disclosure. (B) The top view schematic shows the needles and a stage assembly that can move horizontally (i.e. in the direction illustrated) for uniform coatings on a rotated drum. A single sweep across the substrate is denoted as a "single scan." (C) A free-standing polyamide film measuring 1.1 µm thick in air, along with the cross-section from SEM. (D) Polyamide thickness as a function of MPD and TMC loading, including the corresponding thickness per scan. (E) Polyamide thickness as a function of the number of scans at a MPD:TMC concentration ratio of 0.125:0.075. For characterization data presented in C-E, the polyamide was prepared on an Al foil substrate and then separated according to FIG. 14A. (F-I) Cross-section TEM of PAN50 (F), PS20 (G), and PAN450 (H and I) TFC membranes made with 5 scans and a MPD:TMC concentration ratio of 0.5:0.3. The displayed thickness represents 20 measurements from the images, except for FIG. 9H where only the thinnest region is measured.

As disclosed herein, electrospray can be used to deposit monomers as nanoscale droplets that form a polymer (e.g. polyamide) onto a substrate. During electrospraying, liquid leaves a needle in the presence of a strong electric field. Coulombic repulsion forces the ejected droplets to disburse with diameters well below 1 μm (FIGS. 9A and 9B). As disclosed herein, individual monomers can be deposited onto a substrate where they can subsequently polymerize in place.

Figure 13:
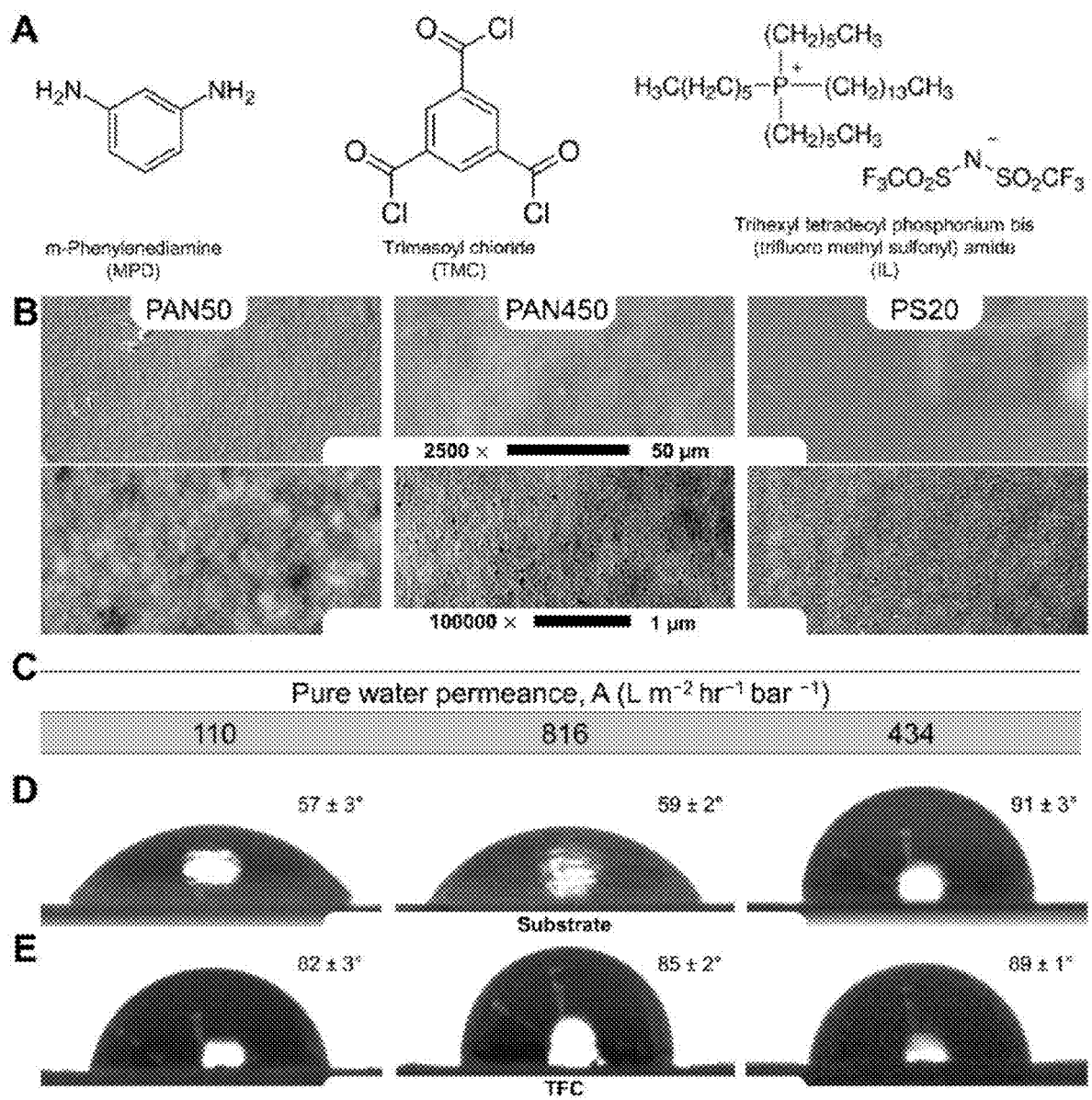
FIG. 13 shows details of the materials and chemicals used in certain exemplary embodiments. (A) Structure of the two monomers used for polymerization reaction and the lipophilic IL. (B) SEM micrographs of the three UF membranes shown at a magnification of 2500 times (top row) and 100,000 times (bottom row). (C) Pure water permeance of the three UF membrane. (D) Contact angle data of the three substrates. (E) Contact angle data of the TFC membranes.

This approach is illustrated in FIGS. 9A and 9B. A drum is grounded and connected to two needles via a high voltage DC power source that can generate up to 30 kV. The distance between the needle tip and drum is kept at about 2 cm to about 3 cm. Each needle extrudes one of the monomers in solution. MPD (in water) and TMC (in hexane) were kept at a molar ratio of 4:1 over a wide range of concentrations (see table below). A lipophilic IL was added to the organic phase to increase the electrical conductivity (FIG. 13A). A variety of UF membrane substrates with different pore sizes (FIG. 13B), pure water permeance (FIG. 13C), and hydrophilicity were studied (FIG. 13D, see table below). In each case, the substrate was first attached to the rotating drum (FIG. 9A). As monomer solutions emerged from the needle tips, they spray and deposit onto the collector surface and react upon contact with each other. To ensure coverage over the entire substrate, the needle stage traverses along the collector surface (FIG. 9B). A single pass over the collector surface is referred to as a "single scan."

| Test conditions | MPD in water (wt/vol) | TMC in hexane (wt/vol) | IL μL/mL of hexane |
|---|---|---|---|
| 1 | 0.0625 | 0.0375 | 1 |
| 2 | 0.0833 | 0.05 | 1 |
| 3 | 0.125 | 0.075 | 1 |
| 4 | 0.25 | 0.15 | 1 |
| 5 | 0.5 | 0.3 | 1 |

| Substrate | MPD:TMC | Contact angle (°) |
|---|---|---|
| PAN50 | Substrate only | 56.6 ± 1.8 |
| PAN50 | 0.0625:0.0375 | 88.2 ± 1.1 |
| PAN50 | 0.0833:0.05 | 81.5 ± 4.5 |
| PAN50 | 0.125:0.075 | 83.3 ± 2.8 |
| PAN50 | 0.25:0.15 | 81.2 ± 1.3 |
| PAN50 | 0.5:0.3 | 85.3 ± 2.6 |
| PAN450 | Substrate only | 59.2 ± 0.9 |
| PAN450 | 0.0625:0.0375 | 82.2 ± 4.3 |
| PAN450 | 0.0833:0.05 | 79.9 ± 1.6 |
| PAN450 | 0.125:0.075 | 74.5 ± 2.6 |
| PAN450 | 0.25:0.15 | 75.1 ± 1.4 |
| PAN450 | 0.5:0.3 | 81.2 ± 1.5 |
| PS20 | Substrate only | 91.0 ± 3.0 |
| PS20 | 0.0625:0.0375 | 82.2 ± 4.3 |
| PS20 | 0.0833:0.05 | 79.9 ± 1.6 |
| PS20 | 0.125:0.075 | 74.5 ± 2.6 |
| PS20 | 0.25:0.15 | 75.1 ± 1.4 |
| PS20 | 0.5:0.3 | 81.2 ± 1.5 |

Figure 14:
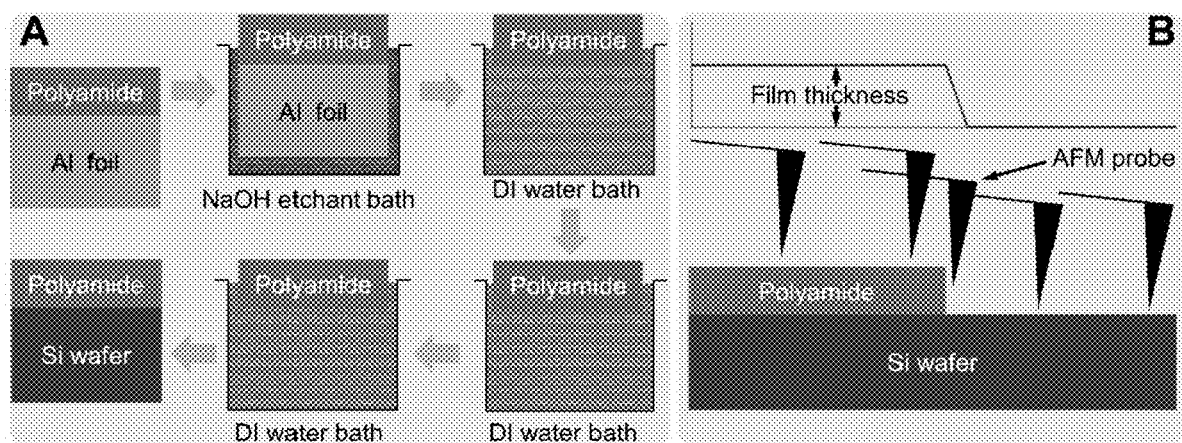
FIG. 14 shows (A) a schematic diagram of an etching process to transfer polyamide film onto Si wafer and (B) an atomic force microscopy (AFM) scanning method to determine the polyamide thickness.
Figure 15:
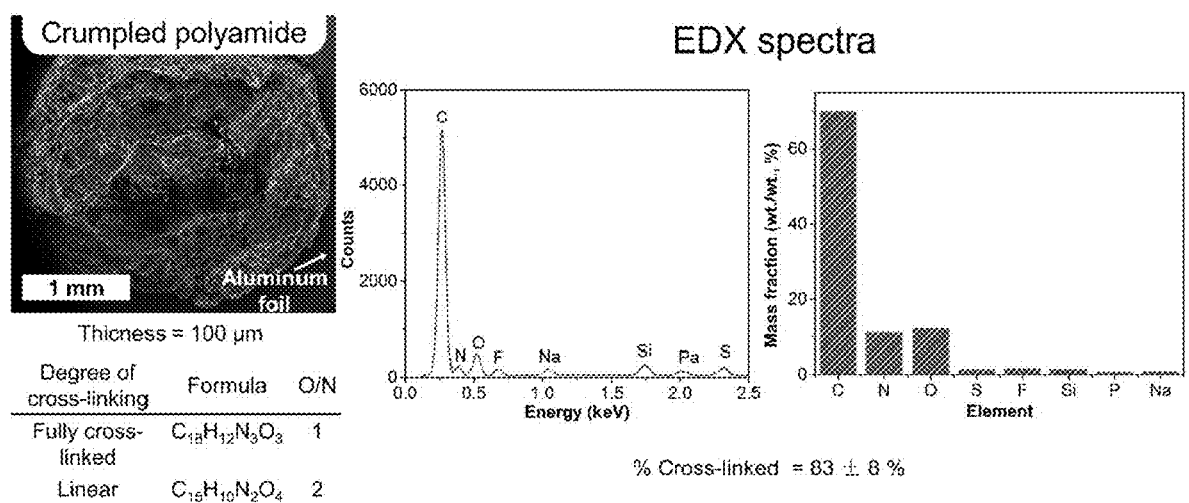
FIG. 15 shows an energy-dispersive X-ray spectroscopy (EDX) analysis on a crumpled polyamide. Standard deviations were calculated from 6 measurements.

Films were printed on aluminum (Al) foil to characterize polyamide films and to find properties such as crosslink density, thickness, mechanical properties, etc. After printing, the films were transferred from the aluminum foil (FIG. 14A) to any substrate or kept as a free-standing film (FIG. 9C). Having thicker films that can be manipulated by hand allows for easier characterization of film properties. This type of manipulation is difficult with conventional polyamide films because of their thinness, fragility, and integration into the supporting structure of typical TFC membranes. For example, determination of cross link density of the polyamide film is typically done using X-ray photoelectron spectroscopy (XPS). However, this XPS method can be inaccurate due to surface roughness, insufficient sample size, and compositional heterogeneity with depth. Instead, manipulating a 1 μm thick polyamide into a thicker, crumpled form (FIG. 15), allows for the use of EDX, which penetrates far deeper into the sample and thus provides a better measurement of bulk polyamide composition. The cross-link density is found to be 83% which is reasonable for a film made from MPD and TMC monomers (FIG. 15).

Without wanting to be limited by theory, the cross-link density may be increased by using many nano-scale droplets, because smaller droplets may increase the surface area between monomers sprayed from different solutions. In this manner, the cross-link density might be improved to be higher than 83%.

Figure 16:
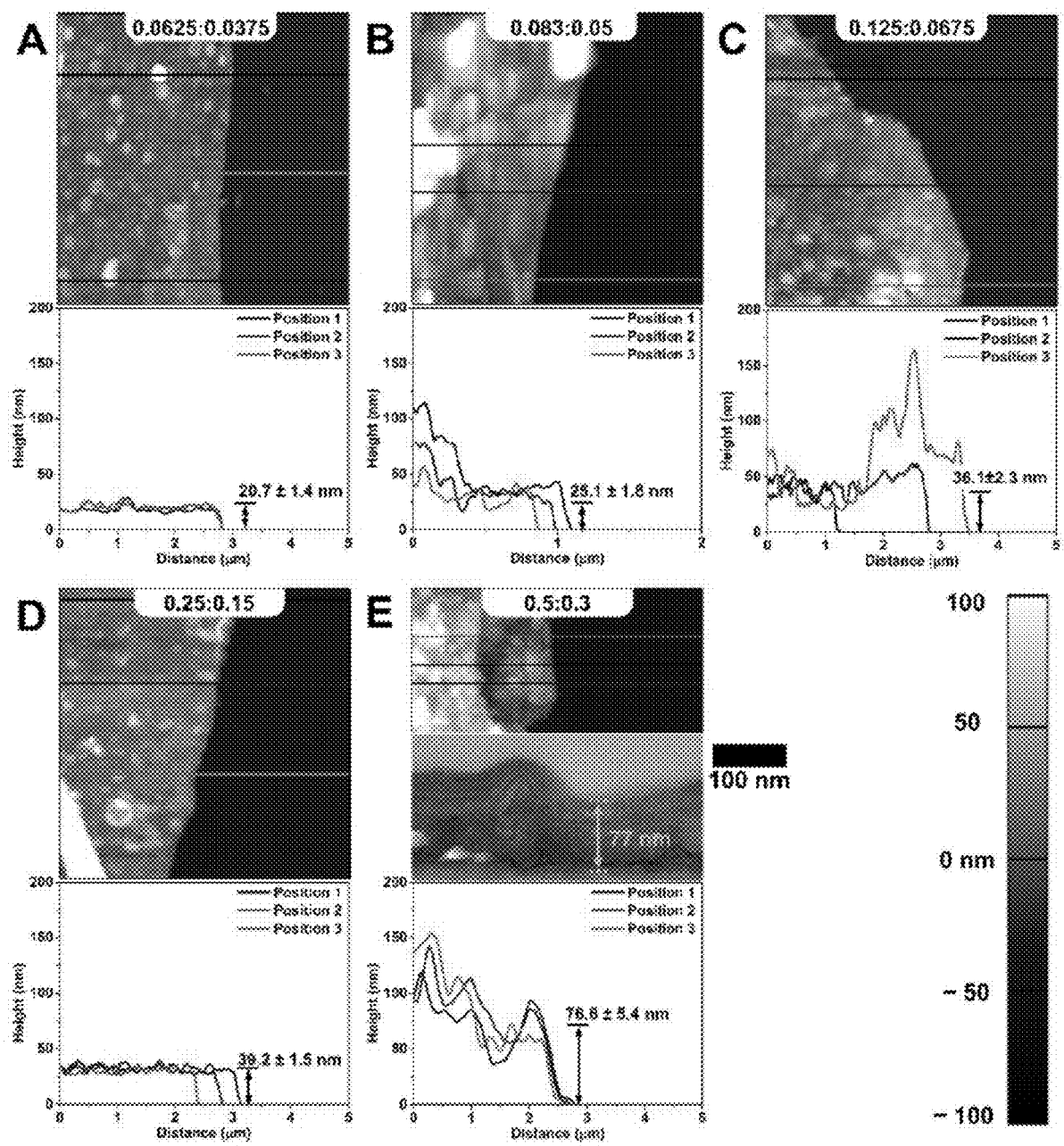
FIG. 16 shows representative AFM height images and cross-sections at the edges of polyamide films affixed to silicon wafers, each made with 5 scans on Al foil with a varying MPD:TMC concentration ratio as indicated. A transmission electron microscopy (TEM) cross-section micrograph is shown on E to show the thickness heterogeneity. Standard deviations were calculated from 6 measurements per sample with 3 samples per condition.
Figure 17:
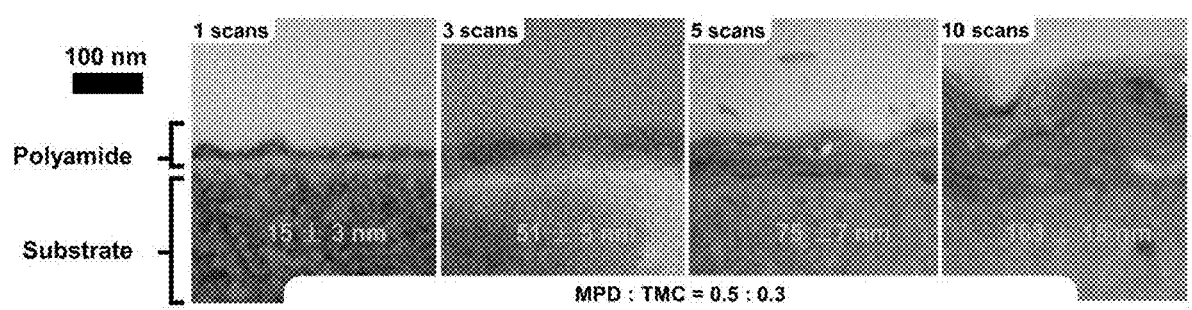
FIG. 17 shows a series of TEM cross-sectional images of polyamide film at 180,000 times magnification with different numbers of scans at a fixed MPD:TMC concentration ratio of 0.5:0.3. Standard deviations were calculated from 4 measurements per sample with 3 samples per condition.

Films were also printed at various MPD and TMC concentrations (see above table) onto Al foils and then transferred to silicon wafers for thickness measurement using AFM (FIG. 14B). Cross sections at the film edges (FIG. 16) revealed the film profile with respect to the underlying planar substrate. Lower monomer concentrations not only resulted in a thinner polyamide film, but also greater control of film thickness per electrospray scan. Polyamide films as thin as 20 nm were made based on 5 scans, indicating a mean thickness of just 4 nm per scan (FIG. 9D). Control of thickness per scan was notably consistent, with FIG. 9E depicting linearity in film growth with an increasing number of scans. At lower concentrations, the control of the thickness may be even better.

Films of the same composition were also printed onto porous polymeric substrates to evaluate their thickness, surface morphology, roughness, desalination performance, and substrate independence. Cross-sectional TEM images are shown in FIGS. 1F-1I and 17. The polyamide layers printed on the three UF membrane substrates exhibit similar thicknesses (FIGS. 1F-1H) as those printed on Al foils (FIG. 9D). There is repeatability in thickness from FIG. 9I, where 5 layers of polyamide film measuring 15±3 nm each are visible. This thickness per scan corresponds well to thickness per scan data captured on aluminum foil in FIG. 9D by AFM. Linearity in thickness was also confirmed with the TEM images shown in FIG. 17.

Figure 10:
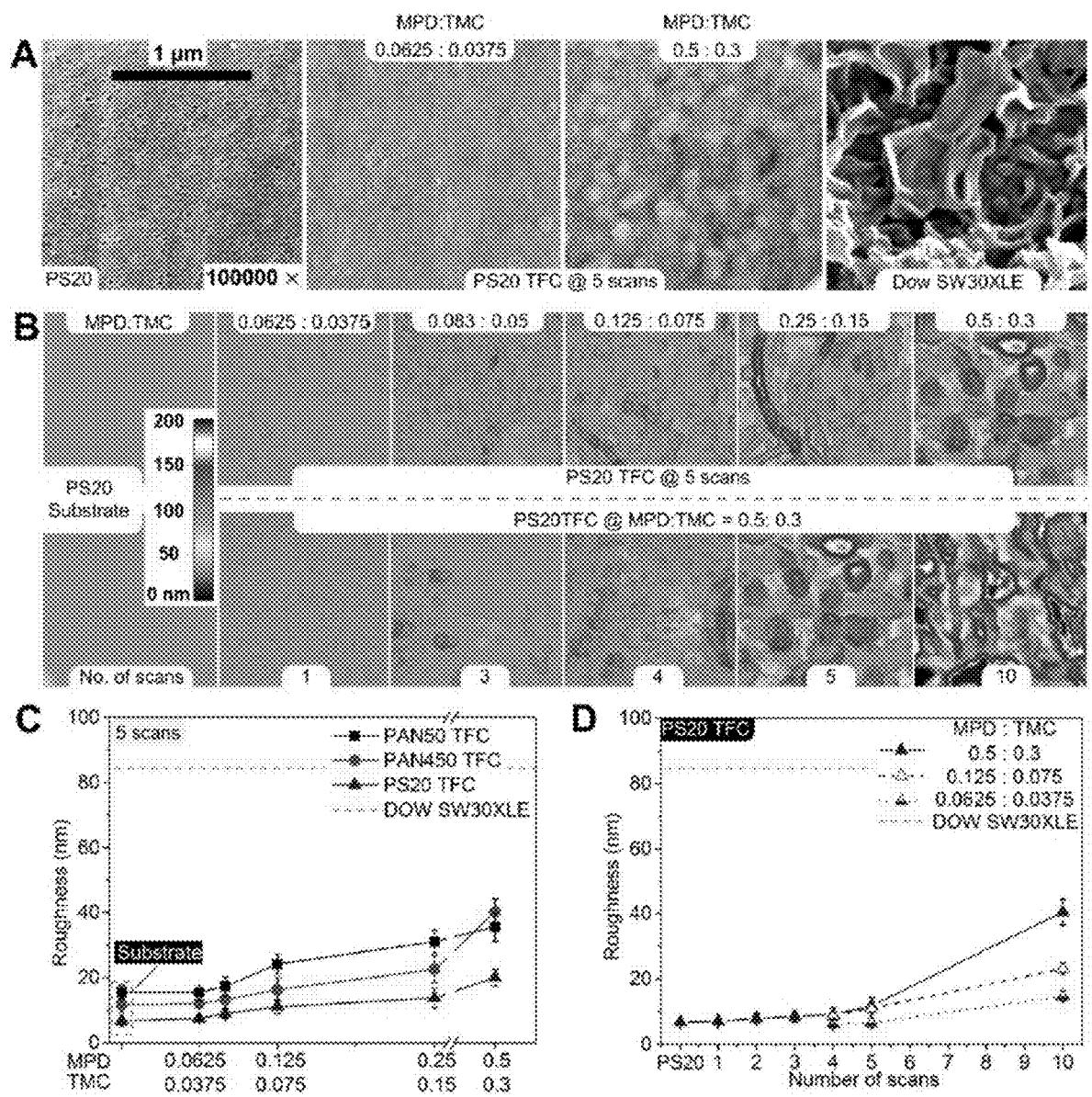
FIG. 10 shows dependency of surface morphology, roughness, and desalination performance on monomer conditions and number of scans. (A) SEM image of TFC membranes at 100,000 times magnification for different concentrations of MPD and TMC. The underlying substrate and a Dow SW30XLE membrane are shown as controls. (B) A series of 3 µm×3 AFM topography images reveal increased surface roughness with the MPD:TMC concentration ratio, either consistently with 5 scans (top row) or due to successive scans for the specific MPD:TMC concentration ratio of 0.5:0.3 (bottom row). The first column displays the substrate without any polyamide film for comparison. The inset numbers indicate either the concentration ratio or the number of scans. (C) Graph showing RMS surface roughness of the TFC membranes using three different UF membranes as substrates for a series of MPD:TMC concentration ratios. The first points in the graph represent the roughness of the substrate only. (D) The surface roughness increases with the number of scans for three different MPD:TMC concentration ratios for PS20 TFC membranes. The commercial Dow SW30XLE TFC RO membrane is shown as a dotted line (C and D) for benchmarking.
Figure 18:
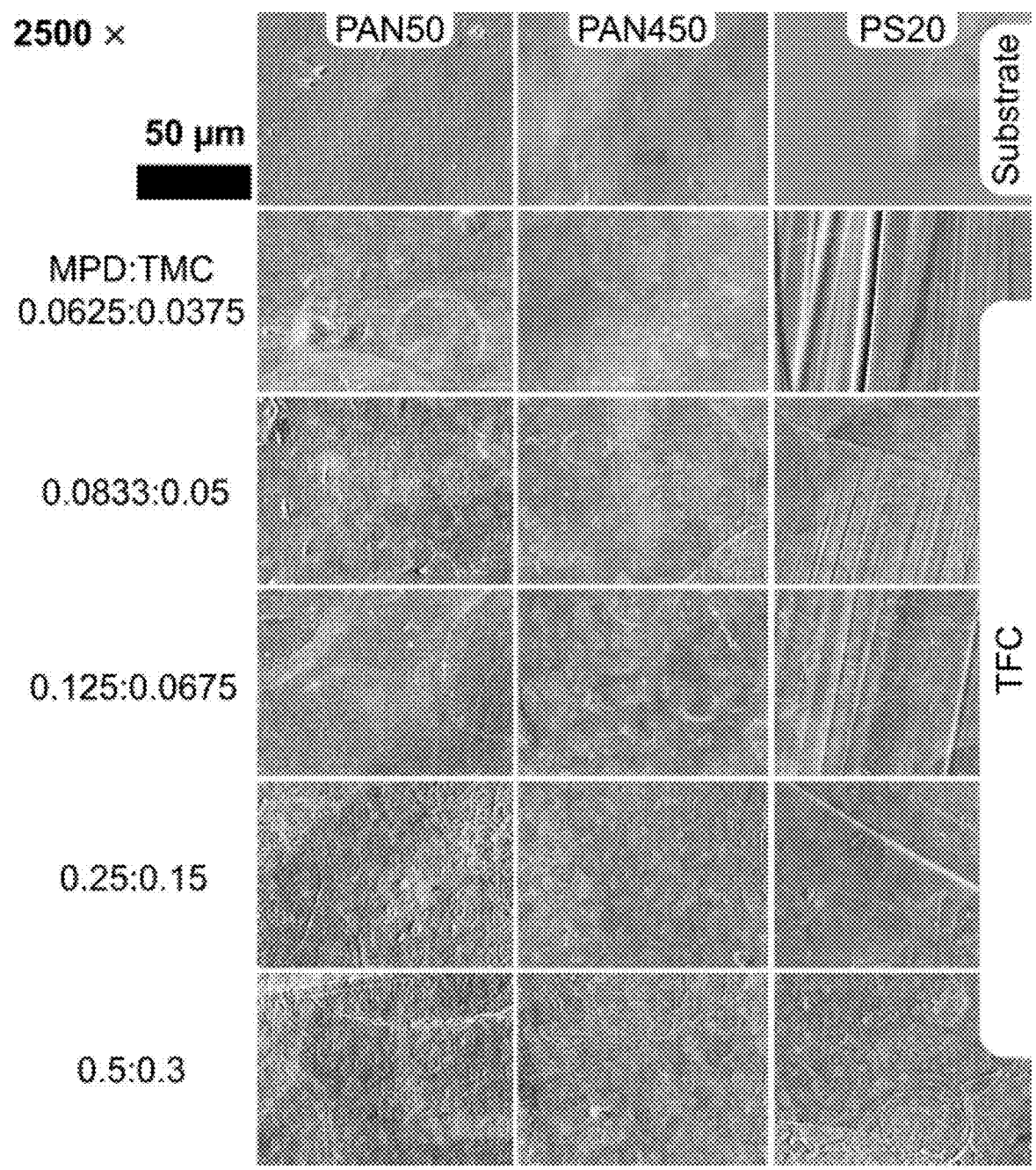
FIG. 18 shows SEM images of various substrates and their TFC membranes at varying MPD:TMC concentration ratios, made using 5 scans and imaged at a magnification of 2500 times.
Figure 19:
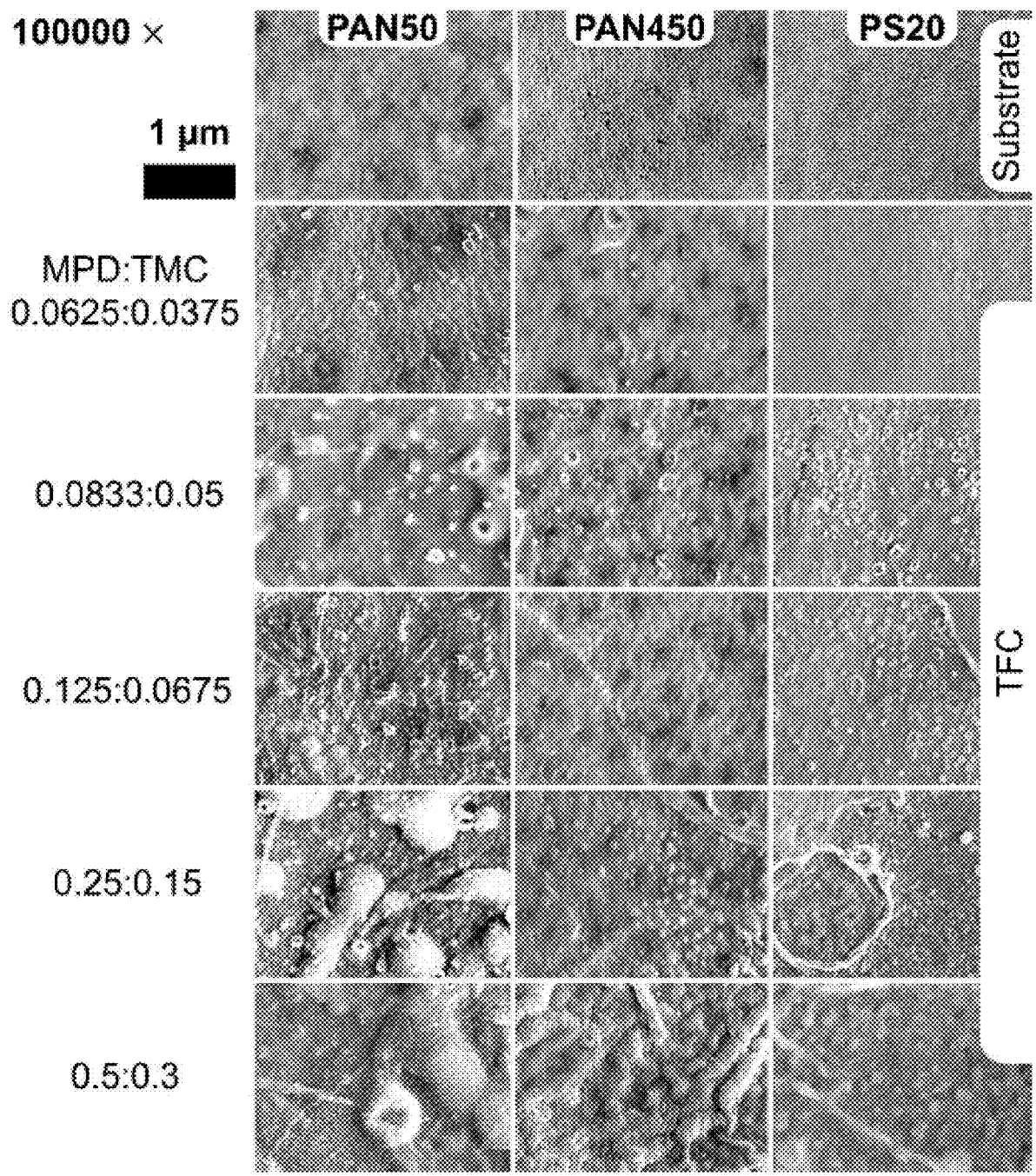
FIG. 19 shows SEM images of all the substrates and their TFC membranes at varying MPD:TMC concentration ratios, made using 5 scans and imaged at a magnification of 100,000 times.
Figure 20:
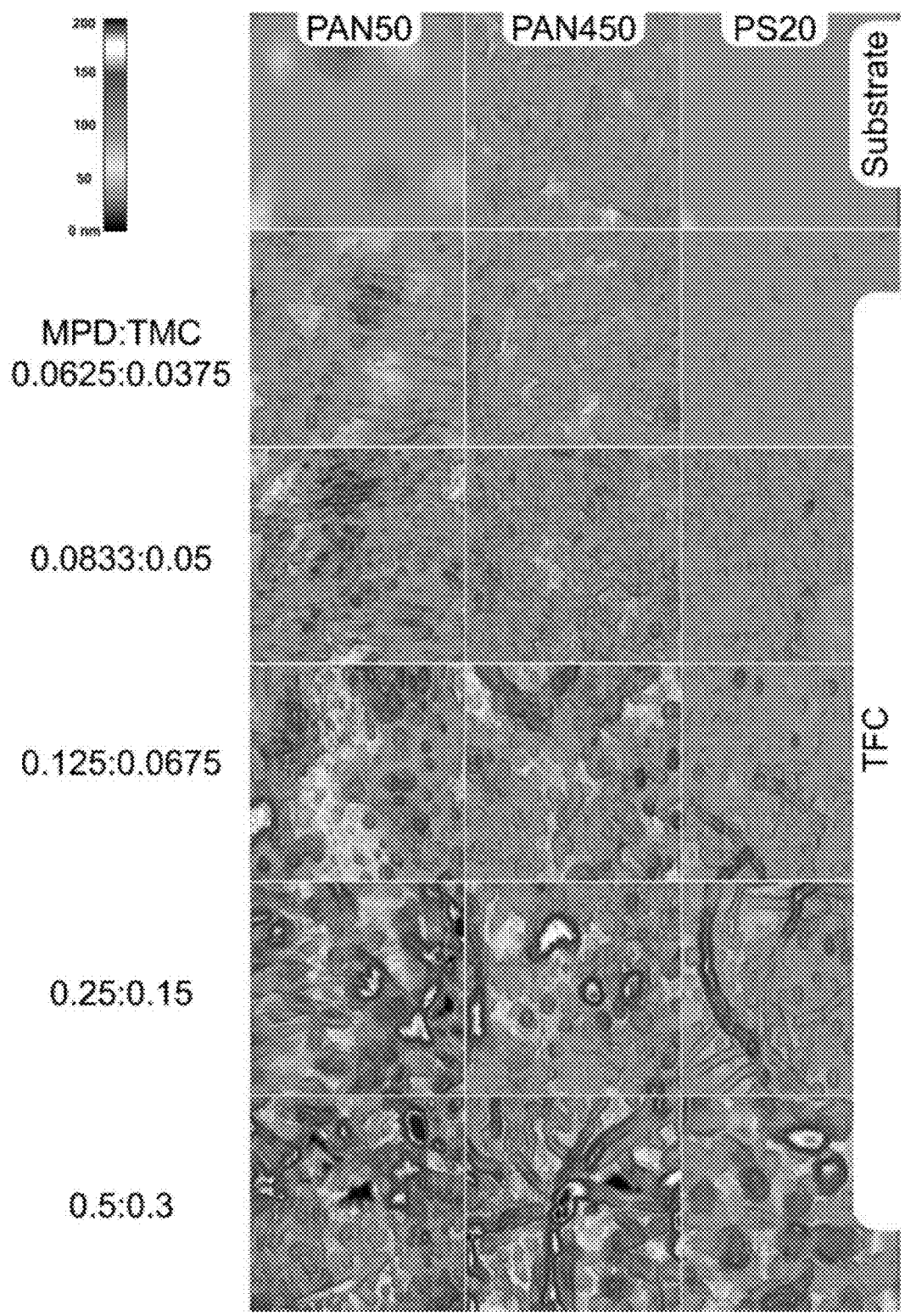
FIG. 20 shows 3 µm×3 µm AFM topography images of the surfaces of several substrates and TFC membranes with various MPD:TMC concentration ratios made using 5 scans.

The surface morphology of the polyamide films formed on polymeric substrates was examined using SEM (FIGS. 10A, 18, and 19). Compared to the typical ridge and valley like morphology of conventional polyamide films, such as the industry standard Dow SW30XLE RO membrane (FIG. 10A), markedly smoother polyamide films are formed on all substrates at all monomer concentrations. These results are quantified by AFM analysis as shown in FIG. 10B. The RMS roughness increased with increasing monomer concentration (FIG. 10C) and the number of scans (FIG. 10D). For each monomer concentration, film roughness was similar among all of the substrates evaluated (FIG. 20 and tables below). The maximum roughness (40±4 nm) was observed for the highest MPD:TMC concentration, 0.5:0.3 (FIG. 10C), when formed on the PAN450 UF substrate. However, even these roughest films exhibit only half the roughness of the Dow SW3OXLE membrane (dotted orange overlay). The lowest concentrations of monomers tested yielded films with roughness values of less than about 2 nm and are indistinguishable from the substrate's roughness.

| Substrate | MPD:TMC | $R_{RMS}$ (nm) | $R_{Avg}$ (nm) | SAD (%) |
|---|---|---|---|---|
| PAN50 | Substrate only | 15.6 ± 2.2 | 12.5 ± 2.0 | 0.7 ± 0.1 |
| PAN50 | 0.0625:0.0375 | 15.5 ± 2.1 | 12.4 ± 1.9 | 1.8 ± 0.6 |
| PAN50 | 0.0833:0.05 | 17.3 ± 2.9 | 13.8 ± 2.5 | 6.1 ± 2.0 |
| PAN50 | 0.125:0.075 | 24.1 ± 5.2 | 18.8 ± 4.3 | 6.0 ± 2.7 |
| PAN50 | 0.25:0.15 | 31.1 ± 6.5 | 24.1 ± 5.0 | 15.4 ± 5.4 |
| PAN50 | 0.5:0.3 | 35.6 ± 4.4 | 28.3 ± 3.9 | 12.4 ± 2.8 |
| PAN450 | Substrate only | 11.7 ± 2.1 | 9.2 ± 1.6 | 2.7 ± 0.4 |
| PAN450 | 0.0625:0.0375 | 10.7 ± 0.9 | 8.3 ± 0.6 | 3.4 ± 0.3 |
| PAN450 | 0.0833:0.05 | 13.4 ± 2.8 | 10.4 ± 2.1 | 5.3 ± 0.9 |
| PAN450 | 0.125:0.075 | 16.3 ± 3.7 | 12.6 ± 2.8 | 6.1 ± 2.3 |
| PAN450 | 0.25:0.15 | 22.6 ± 4.2 | 17.2 ± 3.2 | 7.0 ± 1.7 |
| PAN450 | 0.5:0.3 | 40.2 ± 6.5 | 31.3 ± 5.2 | 13.9 ± 2.4 |
| PS20 | Substrate only | 6.7 ± 2.7 | 6.4 ± 3.1 | 3.6 ± 2.6 |
| PS20 | 0.0625:0.0375 | 4.4 ± 0.5 | 3.4 ± 0.3 | 1.2 ± 0.2 |
| PS20 | 0.0833:0.05 | 5.7 ± 1.5 | 4.6 ± 1.2 | 1.9 ± 0.8 |
| PS20 | 0.125:0.075 | 11.0 ± 4.2 | 7.2 ± 2.4 | 2.8 ± 1.0 |
| PS20 | 0.25:0.15 | 13.8 ± 6.1 | 7.5 ± 2.7 | 3.1 ± 1.7 |
| PS20 | 0.5:0.3 | 11.8 ± 2.6 | 9.0 ± 2.2 | 2.8 ± 1.5 |

| MPD:TMC | No. of scans | $R_{RMS}$ (nm) | $R_{Avg}$ (nm) | SAD (%) |
|---|---|---|---|---|
| 0.0625:0.0375 | PS20 only | 6.7 ± 2.7 | 6.4 ± 3.1 | 3.6 ± 2.6 |
| 0.0625:0.0375 | 4 | 5.1 ± 0.3 | 4.4 ± 0.9 | 3.4 ± 0.5 |
| 0.0625:0.0375 | 5 | 4.4 ± 0.5 | 3.4 ± 0.3 | 1.2 ± 0.2 |
| 0.0625:0.0375 | 10 | 14.6 ± 1.5 | 11.9 ± 1.2 | 11.3 ± 1.8 |
| 0.125:0.075 | 4 | 8.7 ± 3.4 | 6.0 ± 1.9 | 1.7 ± 0.4 |
| 0.125:0.075 | 5 | 11.0 ± 4.2 | 7.2 ± 2.4 | 2.8 ± 1.0 |
| 0.125:0.075 | 10 | 23.1 ± 6.0 | 23.8 ± 7.6 | 3.1 ± 1.2 |
| 0.5:0.3 | 1 | 4.8 ± 0.7 | 3.7 ± 0.4 | 1.8 ± 0.3 |
| 0.5:0.3 | 2 | 6.1 ± 1.5 | 4.4 ± 1.0 | 2.0 ± 0.3 |
| 0.5:0.3 | 3 | 5.9 ± 1.6 | 4.4 ± 1.1 | 1.4 ± 0.3 |
| 0.5:0.3 | 4 | 9.0 ± 2.2 | 6.5 ± 1.4 | 2.1 ± 0.5 |
| 0.5:0.3 | 5 | 11.8 ± 2.6 | 9.0 ± 2.2 | 2.8 ± 1.5 |
| 0.5:0.3 | 10 | 40.5 ± 12.4 | 40.1 ± 9.9 | 7.5 ± 3.0 |

Figure 11:
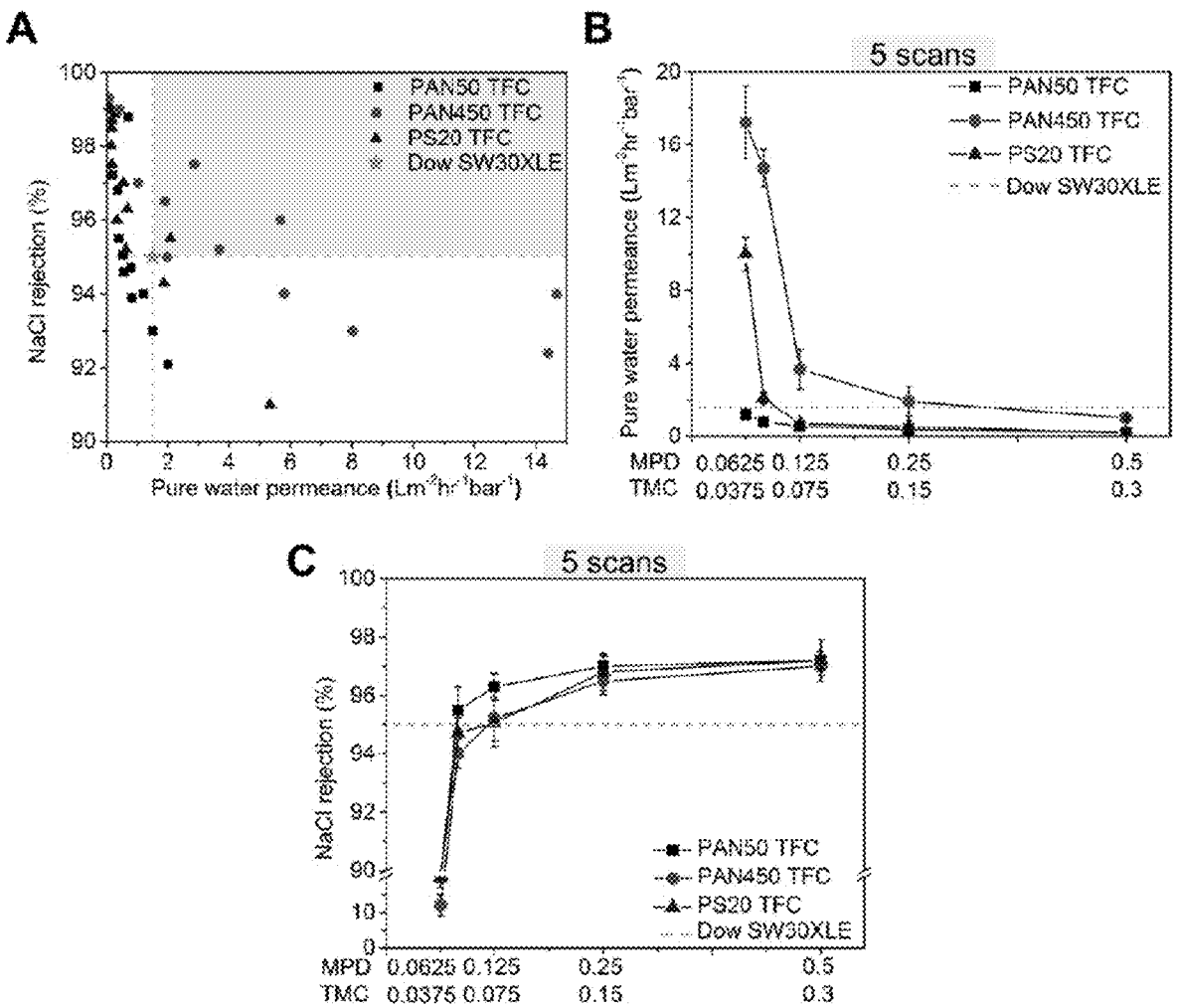
FIG. 11. shows dependency of surface morphology, roughness, and desalination performance on monomer conditions and number of scans. (A) Variation of NaCl salt rejection and pure water permeance for different membranes, displayed as a function of three different UF membrane substrates. (B and C) Comparison of pure water permeance and NaCl salt rejection, respectively, between UF substrates for TFC membranes made with 5 scans over about 1 order of magnitude (e.g. about 10 times) increase in MPD and TMC loading. The commercial Dow SW30XLE TFC RO membrane is shown as a dotted line (B and C) or as an orange star point (A) for benchmarking.

The desalination performance for all membranes tested are presented in FIG. 11A, where higher salt rejection and water permeance are desired. Using the SW30XLE as a control and for benchmarking purposes, 6 of the tested membranes had both higher rejection and water permeance (within the grey rectangular overlay) and 30 are higher in one metric or the other. It is notable that these membranes can have tailorable thickness and substantially lower roughness while exhibiting comparable or better performance than an industry standard membrane in the conventional metrics of water permeance and salt rejection.

Figure 21:
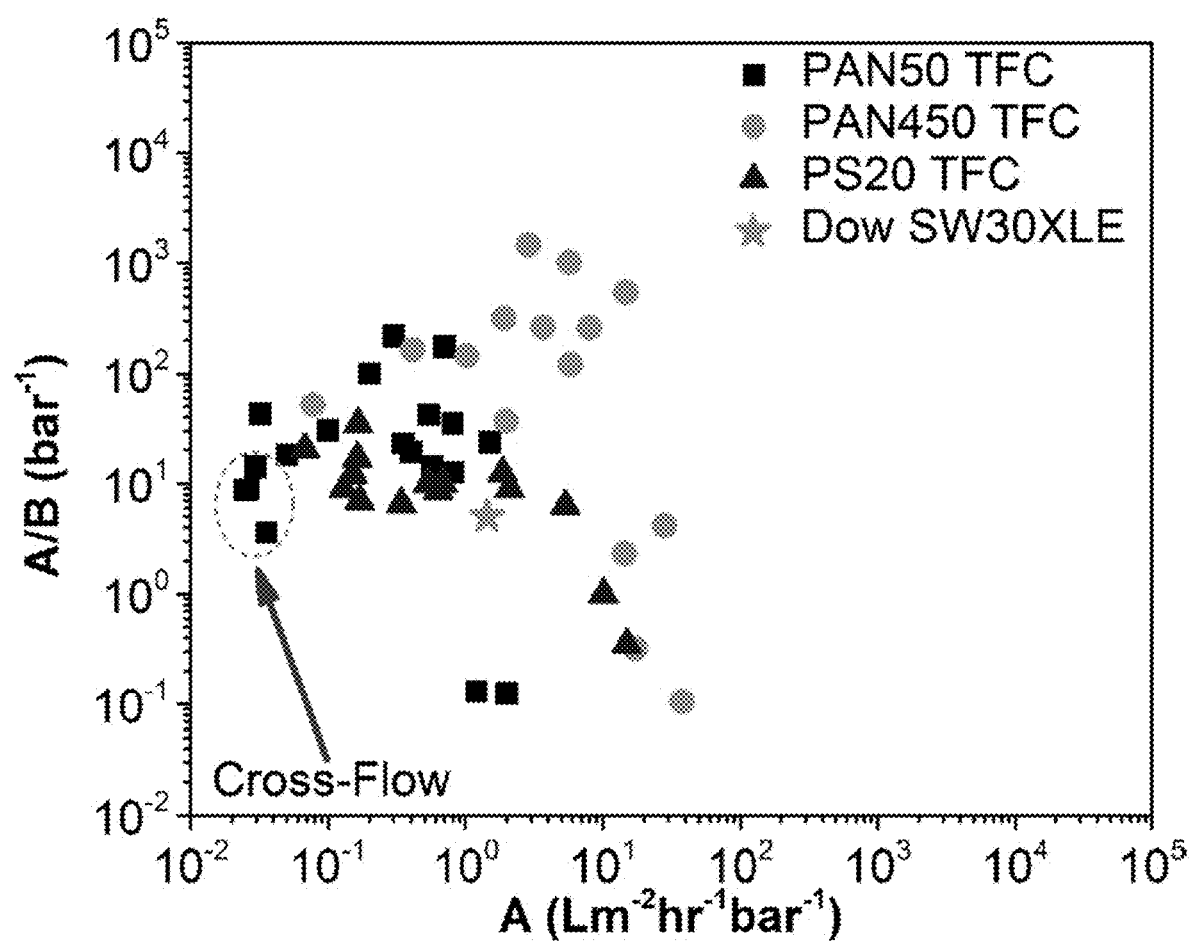
FIG. 21 shows water-salt permselectivity plotted against pure water permeance for various membranes investigated, with an area of about 46 cm$^2$ for the dead-end RO and about 24 cm$^2$ for the cross-flow RO setup. The results from TFCs prepared on several distinct substrates are indicated as shown. The dashed oval overlay identifies membranes made using the PAN50 support, which were specifically tested in the cross-flow RO. The performance of a commercial DOW SW30XLE TFC RO membrane is also identified.

Water permeance (FIG. 11B) and salt rejection (FIG. 11C) were shown to have a strong dependency on monomer concentration. Higher concentrations of monomers formed thicker (FIG. 11A) and less permeable films (FIG. 11B) while improving salt rejection (FIG. 11C). The efficacy of the TMC membranes can also be considered by redefining such data in terms of permselectivity, provided in FIG. 21, where again these membranes similarly outperform conventional membranes.

Figure 22:
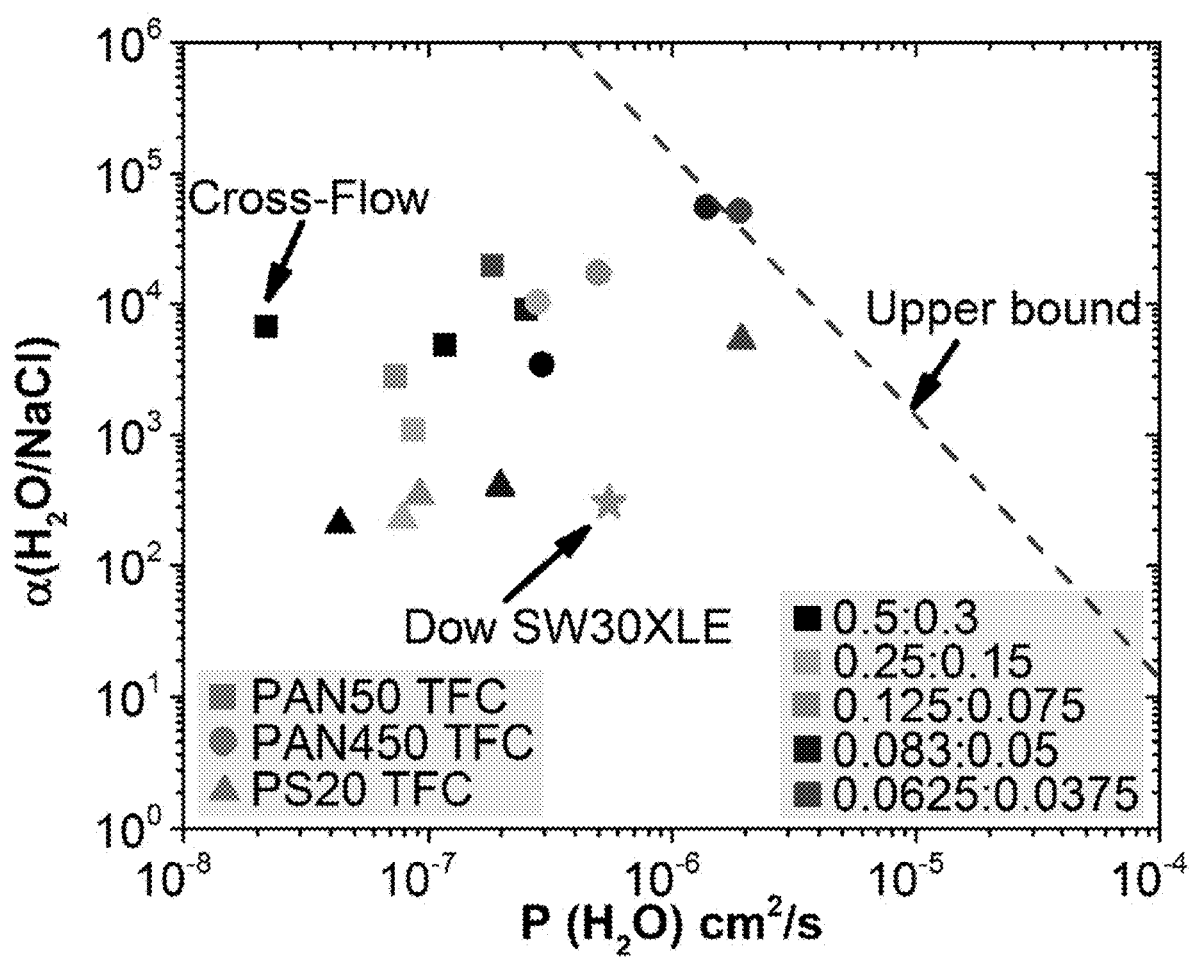
FIG. 22 shows calculated perm-selectivities for membranes relative to a theoretical upper bound relationship. All membranes shown were made with 5 scans and tested with a coupon area of about 46 cm$^2$ for the dead-end RO and about 24 cm$^2$ for the cross-flow RO setup. The polyamide membranes made using distinct combinations of monomer solutions are indicated by color, while the data point shapes identify the specific supports on which they were deposited. One membrane was made using just the PAN50 support, which was also tested in the cross-flow system. The Dow SW30XLE value was calculated assuming a polyamide thickness of 100 nm.

The substrate selection has a noticeable effect on permeance. This may be attributed to pore size and spacing on the substrate. The most permeable substrate (PAN 450 on FIG. 13C) exhibits the largest pores that are also closest together. This means that water diffusing through the film has less distance to travel to desorb through an open pore into the porous support, resulting in higher permeance. These higher permeance values enabled the best performing membranes to match the upper bound limit of the selectivity-permeability tradeoff relationship, as shown in FIG. 22.

Furthermore, there was no substrate effect on rejection (FIG. 11C), since rejection is primarily a function of the selective film chemistry and structure. These film features were indistinguishable when deposited onto the three different substrates.

Figure 23:
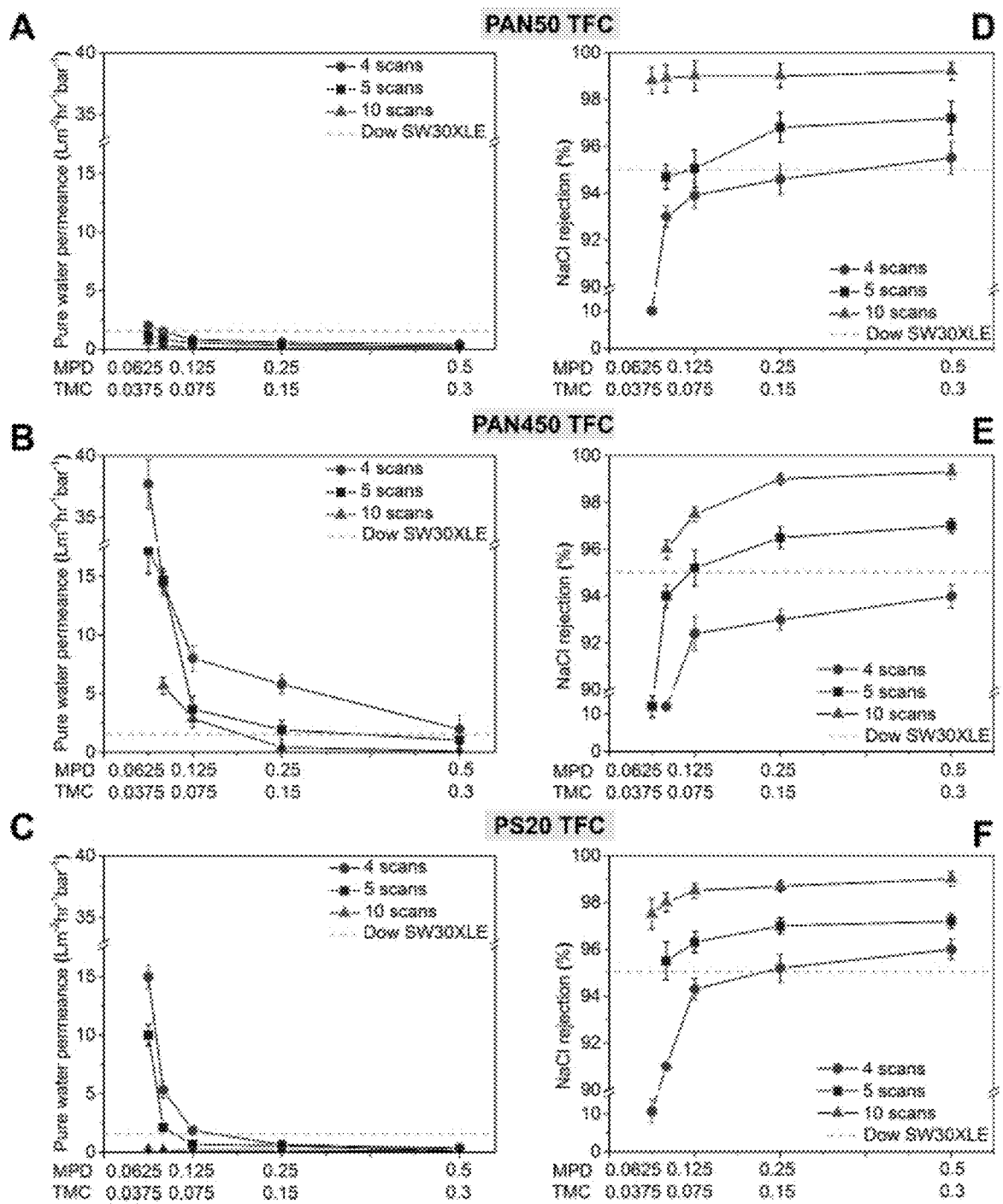
FIG. 23 shows desalination results for various TFC membranes: pure water permeance (A, B, and C) and NaCl salt rejection (D, E, and F) for the PAN50, PAN450, and PS20 TFC membranes at different scans and MPD:TMC concentration ratios. Operating conditions were 10 bar applied pressure with DI water and 2000 ppm NaCl solution in a stirred cell. The membrane coupon area was 46 cm$^2$. Results using the commercial Dow SW30XLE TFC RO membrane is shown as an orange dotted line for benchmarking.

Further tuning of desalination performance was accomplished by changing the number of scans and hence polyamide thickness, as shown in FIG. 23. Some of the thinnest membranes exhibited very high permeance, though the highest of these had correspondingly low salt rejection (about 10%). The TFC membranes made with 5 scans and an MPD:TMC ratio of 0.083:0.05 on the PAN 450 UF membrane exhibited a reasonable salt rejection of 94% with a permeance of about 14.7 LMH/bar. This membrane also exhibited an RMS roughness only 2.3 nm higher than the substrate RMS roughness of 11.7 nm. This is less than one-sixth that of the SW30XLE membrane. Rejections as high as 95% were achieved on the same substrate for a MPD:TMC ratio of 0.125:0.075, with a RMS roughness only about 4.3 nm greater than the substrate and a water permeance of 3.68 LMH/bar. Increasing the number of scans to 10 yielded a salt rejection of 97.5% while still maintaining a water permeance of 2.87 LMH/bar and a RMS roughness of less than 20 nm.

This additive approach to making TFC membranes has resulted in membranes with tunable thickness and roughness that still retain the selectivity expected of reverse osmosis membranes. These membranes have an intrinsic smoothness not seen in existing TFC membranes, can be tailored to thicknesses as low as about 15 nm with as little as about 4 nm resolution in thickness control, and can be formed on substrates without preparation. Furthermore, by decoupling the polyamide formation from the substrate properties, the formation of TFCs on unconventional substrates is enabled and allows for film characterization that would be impossible with polyamide films formed through conventional interfacial polymerization. The adaptation of this approach to other monomers or even simple polymers dissolved in solvents might enable the development of other TFC membranes for use in other separations.

Several UF membranes, including the PS 20 (polysulfone based UF membrane with 20 kDa MWCO), PAN 50 (polyacrylonitrile based UF membrane with 75 kDa MWCO), and PAN 450 (polyacrylonitrile based UF membrane with 250 kDa MWCO) were purchased from Sepro (now Nanostone Water) and were used as-received. A commercial SW30XLE flatsheet RO TFC membrane from Dow was used to benchmark performance against the tested membranes. Commercial grade aluminum foil (Reynolds Wrap) and silicon wafers (University Wafer) were used without modification. M-phenylenediamine (MPD, >99%), tri-hexyl tetradecyl phosphonium bis-(trifluoro methyl sulfonyl) amide (IL, >95%), 1,3,5-benzenetricarbonyl trichloride (TMC, 98%), and sodium hydroxide (NaOH, >97%) were purchased from Sigma-Aldrich. Hexane (HPLC grade, >99%), sodium chloride (NaCl, crystalline, certified ACS), and isopropanol (IPA, >99.5%) were purchased from Fisher Scientific. Deionized water (DI) was produced using a Millipore Integral 10 water system.

Figure 12:
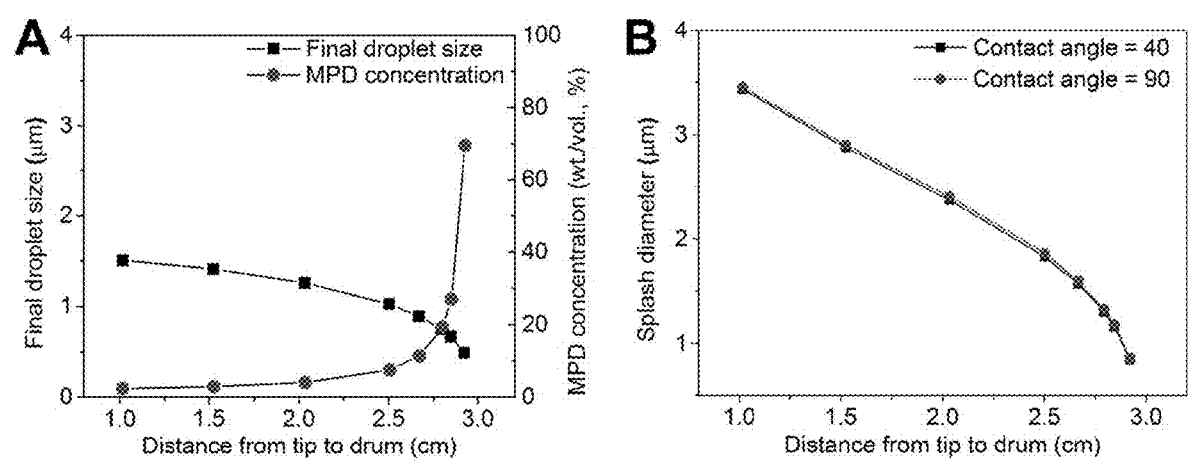
FIG. 12 shows model results showing changes in droplet size and MPD monomer concentration as it moves through air and deposits on the drum (A), and effects of substrate hydrophilicity on splash diameter (B) with respect to different tip to drum distances. Model conditions include an applied voltage of 10 kV, a flowrate of 10 mL/hr, MPD concentration of 2% (wt of MPD/vol of water), viscosity of air ($\mu_a$) of $1.983 \times 10^{-6}$ Pa·sec, density of air ($\rho_a$) of 1.225 kg/m$^3$, viscosity of water ($\mu_w$) of $1.002 \times 10^{-3}$ Pa·sec, density of water ($\rho_w$) of 1000 kg/m$^3$, latent heat of vaporization of water (L) of $2.26476 \times 10^6$ J/kg, diffusivity of water in air ($D_{wa}$) of $2.82 \times 10^{-5}$ m$^2$/sec, surface tension of water ($\gamma_w$) of $7.197 \times 10^{-2}$ N/m, conductivity of water ($K_w$) of 0.008 S/m, boiling point of water ($T_{bw}$) of 100° C., aqueous phase temperature ($T_L$) of 25° C., vacuum permittivity ($\varepsilon_0$) of $8.854 \times 10^{-12}$ A$^2$·sec$^4$/(kg·m$^3$), relative permittivity ($\varepsilon_r$) of 80.1, and frictional drag coefficient ($f_d$) of 0.6.

An exemplary embodiment of the disclosed electrospray system is presented in FIGS. 9A and 9B. A high voltage DC power source (Gamma High Voltage Research) capable of generating up to 30 kV was connected to two stainless steel needles (26 gauge). The needles were suspended from an L-shaped arm (FIG. 9A) that was attached to a stage (FIG. 9B). The distance between the two needles was 6 cm, and the distance between the needle tips and the rotating drum was between 2 cm and 3 cm. The distance between the needle and drum was determined based on simulation results from empirical models for electrospraying as shown in FIG. 12. The two needles were aligned along the X-axis as denoted in FIG. 9B. The stage was mounted on a screw slider that moves in the Y-direction (the axial direction of the drum) using a stepper motor that was controlled by a motor controller (Velmex). The drum was grounded to establish the potential difference between the needle tips and drum.

Aluminum foil was used to cover the entire drum. The UF membrane was then attached and wrapped around the foil-wrapped drum where part of the foil on the edges of the drum were left exposed. Electrospraying was initiated on the aluminum foil to allow the spray to stabilize (since the deposited material could be seen easily). On the foil, one should look for a hazy deposition which depicts a uniform formation of polyamide. If one sees droplets or lines, a stable spray is not being achieved. The width of the deposition region on the foil should be about 1 cm to about 2 cm for both sprays. This is generally achieved by setting the needle tip to drum distance between about 2.5 cm to about 5 cm and the applied voltage between about 4 kV to about 7 kV. Once the deposition was found to be uniform by visual observation, the Velmex controller was activated, which was programmed to begin the movement of the needle stage over a distance of 16 cm in the Y-direction (as shown in FIG. 9B) as the drum turned. When the needle traversed the entire substrate once, that was considered "one scan." If more scans were desired, the stage would come back to the original position at a speed of 4 cm/sec (taking about 5 seconds to return to the starting position) and start the next scan. For making membranes intended for desalination tests, the number of scans were varied from 1 to 10 when using polymeric substrates. Films made on foil were made with between 5 and 60 scans for thickness measurement and other characterizations (FIGS. 9C, 9D, and 9E). When the drum rotated at 20 RPM and the Y-direction speed of the stage was about 350 μm/sec to about 500 μm/sec, there was about a 95% overlap in the deposition region from the previous rotation. This was done to ensure good coverage of the polyamide.

Several different monomer concentrations of both MPD and TMC were considered (see table above). The MPD and TMC concentrations were chosen such that the MPD:TMC molar ratio was held constant at 4:1. MPD remained in excess as is done with conventional interfacial polymerization to ensure a high cross link density. The MPD was dissolved in DI water while the TMC was dissolved in hexane. The addition of a lipophilic IL into the non-polar hexane solution improved the electrical conductivity. A ratio of 1 μL IL per 1 mL of hexane was added based on earlier work on mass spectrometry. Besides the lipophilic IL, other spray aids could have been used to improve conductivity, such as lithium chloride or other salts, although not all salts would be suitably soluble in organic solvents.

Monomer solutions of MPD and TMC were then fed to two separate needles using a syringe pump at a flowrate of 5 mL/hr while using flexible tubing (McMaster-Carr #1883T1) as delivery lines. Initially, about 2 mL to about 3 mL of solution was used to flush the lines before starting the system. The drum was then set to rotate at 20 RPM, and the voltage was set between 4 kV to 6 kV and adjusted for each test to create a stable spray condition. A stable electrospraying condition refers to a cone-jet mode where the liquid is elongated into a long, fine jet of droplets that deposit onto the substrate surface. As the drum was rotating (as shown in FIG. 9A) and as both of the needles were aligned along the direction of rotation (as shown in FIG. 9B), the TMC solution deposited on top of the MPD solution that had been deposited about 300 msec earlier.

After a stable spray had been formed and tested on the aluminum foil, the movement of the stage was initiated by the Velmex controller as described above. Once the desired number of scans had been achieved, the sample was removed and stored for further characterization. After each membrane was made, the delivery lines were thoroughly cleaned with DI water, dried with air, and rinsed with the solvent that they typically carry (e.g. water for MPD and hexane for TMC) and the needles were replaced to ensure consistency. Prior to each test, the lines were flushed with the liquid that was being used for that test.

Surface hydrophilicity: A CAM 101 series contact angle goniometer (KSV Company) was used to measure contact angle using the sessile drop method. A droplet volume of 10±1 μL of DI water was used for each test at 6 random locations on 3 independent coupons of TFC membrane and substrate. The contact angle was measured within 1 second of the droplet being deposited on the surface. The tests were conducted at room temperature with a relative humidity of 60%.

Scanning electron microscopy: A scanning electron microscopy (SEM) was used to image the top surface of the polyamide layer and the supporting substrate layer of the membrane. A FEI TeneoLoVac SEM was used. For imaging surface morphology, membrane samples were dried, attached to the SEM stage, and sputter coated with a thin layer of gold (Au) and platinum (Pt) under vacuum (0.6 torr). A coating time of 30 seconds with 20 mA current was selected, which added about 10 nm to about 20 nm of coating. After coating, membranes were imaged in the SEM using a 10 kV to 15 kV accelerating voltage, a working distance of 5 mm to 10 mm, and the ETD detector using SE mode.

Elemental analysis: To perform EDX, thick films (60 scans) were formed on aluminum foil and removed by submersing the foil into 1.5 M NaOH solution. The film detached from the foil and floated to the top of the water where it could be collected. The thick film of polyamide is shown in FIG. 9C, and FIG. 14 illustrates the procedure. To ensure that the polyamide did not contain any residual NaOH, it was washed with DI water several times. It was then transferred to a new piece of foil and crumpled to form a thick about 100 μm layer as shown in FIG. 15. The Al foil was attached to a SEM stub using conductive tape and inserted into the microscope without any conductive coating layer.

Manipulating the 1 μm thick polyamide into a thicker, crumpled form (FIG. 15) allowed for use of EDX, which penetrates much too deep (about 1 μm to about 2 μm) to be used on conventionally formed polyamide films. If EDX were used on a polyamide film that was still attached to the substrate, it would measure more of the substrate than the polyamide. An accelerating voltage of 15 kV with a probe current of 6.4 nA at a working distance of 14 mm was used for EDX. Six different locations were chosen for a point scan. After each point scan, a table was created by the provided EDX analysis software that contains the elemental composition of C, N, and O only. The cross-link density was then calculated using the O/N ratio. For the fully cross-linked portion of the polymer (termed as m), this ratio is 1. For a fully linear portions of the polymer (termed as n), this ratio is 2. The following two equations were then solved simultaneously to calculate m and n:

$$\frac{O}{N} = \frac{3m+4n}{3m+2n}$$
$$m+n=1$$

The degree of cross-linking was calculated according to the following equation:

$$\% \text{ cross linked} = \frac{m}{m+n} \times 100$$

Roughness measurement: Several measurements of the surface roughness of the polyamide films and the substrate materials were determined using an AFM (Asylum Research MFP-3D) with a silicon AFM tip (Pointprobe, Nanoworld Innovative Technologies). The Dow SW30XLE TFC membrane was used as-received as a benchmark. The samples were dried and attached to glass slides using double sided tape and adhesive glue to ensure complete physical contact between the glass slide and the sample. Initially, a 20 µm×20 µm was imaged at 1 Hz to ensure that there was no unusual obstruction that could damage the probe tip. Next, 3 µm×3 µm images were acquired at line rates of 3 Hz, using intermittent-contact (also known as AC) mode with typical feedback gain settings to optimize surface tracking. This same area was imaged again using a line rate of 1 Hz, and the difference was not significant. For faster characterization, 3 Hz was chosen as the final speed. The results are presented as root mean square roughness (Rq), average roughness (Ra), and surface area difference (SAD), tabulated above and graphically presented in FIGS. 10C, 10D, and 21. Standard deviations are included with an N of 15. This is based on images for 3 samples from each membrane type, with 5 regions analyzed for each sample.

Film thickness: The thickness of the polyamide film affixed onto a Si wafer was determined from cross-sections of AFM images. To avoid probe damage when traversing feature edges and best extract the true surface topography, a low line rate of 0.5 Hz was implemented. A schematic of a method to transfer the polyamide film is shown in FIG. 14. A polyamide film was first printed onto aluminum foil and then etched off using a 1.5 M NaOH aqueous solution as described above. The film was then transferred onto a Si wafer measuring about 2 cm×2 cm and washed using 3 different DI water baths. Finally, the polyamide film on the Si wafer (referred to as PA-Si) was air dried at room temperature and stored for AFM characterization. For thickness measurements, the sample edge was located optically and then imaged using the AFM cantilever tip in intermittent contact (AC) mode. As sketched in FIG. 14, the cantilever tip tracks the step edge, and the difference between the underlying Si wafer plane and the top of the polyamide film (as shown in FIG. 14) allows for nanoscale quantification of the thickness of the polyamide films, FIG. 17. The displayed standard deviations are based on 3 distinct sections per image as shown.

Transmission electron microscopy: Membrane samples were cut into 1 mm×2 mm pieces and placed into 1% osmium tetroxide for 1 hour. Shell vials were covered with aluminum foil during this step to prevent osmium photo degradation. Samples were dehydrated through a series of graded ethanol for 10 minutes each at 30%, 50%, 70%, 90%, and 100% four times. Spurr's resin containing ERL 4221 (3,4-epoxycyclohexane methyl 3,4-epoxycyclohexyl-carboxylate), DER 736 epoxy resin, NSA (Nonenyl succinic anhydride modified), and DMAE (2-(dimethylamino) ethanol) was freshly prepared. The membranes were infiltrated in a 1:2 mixture of resin:ethanol for 2 hours and a 2:1 mixture of resin:ethanol overnight. The following day, the samples were infiltrated in 100% Spurr's resin for 4 hours with one change of resin after 2 hours. Samples were flat embedded in double end molds (Cat #10590, Ted Pella, Inc.), properly labeled, and polymerized in an oven (Lab-Line Instruments, Inc.) under vacuum at 60° C. overnight. Semi-thin sections (about 1 µm) were cut with a histo 45° Diatome diamond knife on a Leica Ultracut UCT microtome and collected on drops of distilled water on Superfrost Plus microscope slides (Fisher Scientific). Sections were stained with a working solution of 1:1 methylene blue:azure blue II and placed on a 30-8010 AB slide warmer (Buehler Ltd) for 15 seconds at 70° C. Sections were examined at the light microscope level in an Olympus microscope to identify suitable material for electron microscopy. Ultrathin (about 70 nm to about 100 nm) sections were cut with an ultra 45° Diatome diamond knife on a Leica Ultracut UCT microtome and collected on 150 mesh copper/palladium grids (Ted Pella, Inc.). Sections were counterstained with 2% aqueous uranyl acetate for 8 minutes, rinsed with distilled water, stained with 2.5% Sato's lead citrate for 3 minutes, and rinsed again with distilled water. Images were obtained using a bright field FEI Tecnai Biotwin G2 Spirit transmission electron microscope operated at an accelerating voltage of 80 kV and equipped with an AMT 2k (4 megapixel) XR40 CCD camera. All the steps were conducted at room temperature in 2 dram glass shell vials with plugs (Fisher Scientific) on a Pelco R2 rotary mixer (Ted Pella, Inc.) at setting 20 to aid the penetration of the chemicals. All the chemicals used to process the samples were EM grade purchased from Electron Microscopy Sciences (EMS).

Membrane desalination tests: Pure water permeance and solute rejection of the membranes were characterized using 2 separate methods described below: dead-end filtration and cross-flow filtration.

The dead-end filtration test setup included 3 stirred cells each designed to house a circular membrane coupon 3 inches in diameter. A fine mesh was used as a spacer beneath each membrane on the permeate side to provide clearance for permeate flow. Using DI water as a feed, the pressure was changed to 115 psi from 75 psi while stirring the system at 300 rpm. The tests were performed at room temperature. Permeate was collected and weighed over time to determine flux at each pressure. A 2000 ppm NaCl feed solution was used for evaluating salt rejection and salt permeability. For these stirred cell tests, the Reynolds number was calculated using the following equation:

$$\text{Re} = \frac{D^2 N \rho}{\mu}$$

where D is the impeller diameter, N is rotation of impeller in seconds, ρ is density of the solution, and µ is the viscosity of the solution. The mass transfer coefficient ($k_{mt}$) for the dead-end system was calculated using the following correlation for dead-end cells and for laminar flow:

$$Sh = 0.285 Re^{0.567} Sc^{0.33} \text{ for } 8 \times 10^3 < Re \leq 3.2 \times 10^4$$

Here, Sh is the Sherwood number (Sh=$k_{mt}$L/$D_{AB}$), where L is the characteristic length, $D_{AB}$ is diffusion coefficient and Sc is the Schmidt number (Sc=µ/(ρ×$D_{AB}$)). The solute observed rejection (% R) and solute permeability (B) were calculated using the following two equations:

$$\% R = \left(1 - \frac{C_{permeate}}{C_{Feed}}\right) \times 100$$

$$B = J_w\left(\frac{1-R}{R}\right)\exp\left(-\frac{J_w}{k_{mt}}\right)$$

Here, $C_{Permeate}$ is the concentration of solute in permeate, $C_{Feed}$ is the concentration of solute in the feed solution, and $J_w$ is the water flux. The mass transfer coefficient was calculated to be about $1.44 \times 10^{-5}$ msec$^{-1}$.

Once stable and repeatable results were obtained with the dead-end setup, a cross-flow bench-scale reverse osmosis setup was then used to test the membrane under crossflow conditions to demonstrate robustness. This setup used cross-flow test cells that house $8 \times 3$ cm$^2$ membrane coupons. Using DI water as feed, the system pressure was varied from 75 psi to 225 psi while keeping the channel velocity constant at 0.24 msec$^{-1}$. The system was run for 24 hours to equilibrate the membrane and stabilize flux. The permeate flux from the test cells was collected and weighed over time to determine the pure water flux. The slope of the graph of water flux vs. applied pressure yields the pure water permeance, A. To measure salt rejection and permeability, a 2000 ppm feed solution containing NaCl salt was used as the feed without replacing the membranes in the cross-flow cell. Permeate was collected at 225 psi once the salt rejection value stabilized. A 24-hour stabilization at 225 psi followed by a pure water permeance test took about 2 days to complete. Salt rejection was measured over 5 days to ensure the membrane remained intact. The membrane was therefore tested under pressure in crossflow for about 7 days.

To calculate the salt permeability, the mass transfer coefficient was calculated using the following equation for laminar flow:

$$Sh = 1.85\left(Re\ Sc\frac{d_h}{L}\right)^{0.33}$$

The resulting mass transfer coefficient calculated for the cross-flow system was found to be $1.85 \times 10^{-5}$ msec$^{-1}$.

Furthermore, since the film thickness of the polyamide was available for a number of membranes, it was possible to find membrane permeability to water ($P_{H2O}$) and the ideal water/salt selectivity, $\alpha_{W/S}$. This is plotted against the theoretical upper-bound in FIG. 22. These membranes exhibit performance that is near, or in a few cases equal to, the upper-bound performance of water desalination membranes.

Droplet size modeling: To predict and adjust the thickness of a film created by electrospray, there are many well-established models that predict droplet size and movement. Many of these models were developed as part of the use of electrospray in high precision analytical tools like mass spectrometry.

During electrospraying, the solution leaves the needle/capillary and forms a Taylor cone at the needle tip from where droplets start to form and move toward the oppositely charged or grounded substrate. Scaling laws for current, charge density, and the droplet size during electrospray have been previously developed, as described in C. Mundo, M. Sommerfeld, C. Tropea, *Int. J. Multiph. Flow,* 21, 151-173 (1995), herein incorporated by reference in its entirety. The effects of electrical conductivity ($K_w$, liquid flow rate (Q), permittivity ($\varepsilon_0$), density of liquid ($\rho_w$), viscosity ($\mu_w$), and surface tension ($\gamma_w$) of the liquid-gas interface on the size and charge density of the droplets are considered in the modeling. As a simple example, the droplet size may vary based on solution properties and the distance a drop travels between the needle and the collector (see, for example, FIG. 12).

Using this analysis, the splash diameter of a droplet ($D_{Splash}$) when it impacts the substrate surface can be calculated. Once $D_{Splash}$ is known, one can calculate how much area each droplet would be able to cover. As an example, if 5 mL of 2% MPD aqueous solution is electrosprayed at a rate of 10 mL/hr, then it can form droplets of $D_p$ in the size of about 1.6 μm. When this droplet reaches the grounded surface, the size reduces to a $D_{p,al}$ of about 1 μm which, would make a $D_{Splash}$ of about 1.8 μm with a film thickness of about 200 nm. This means that a 5 mL solution could theoretically cover an area of about 23 m$^2$. However, an assumed circular splash pattern would require splash overlap to prevent defects in the film.

Among other things, disclosed herein is an efficient way of controlling roughness and thickness of thin films having excellent performance in desalination membranes. Synthesis of such films is support-independent with regard to roughness and thickness. The disclosed methods comprise a simple process that can be easily scaled up.

While the invention has been described with reference to preferred embodiments, it will be understood by those skilled in the art that various changes may be made and equivalents may be substituted for the elements thereof without departing from the scope of the invention. In addition, many modifications may be made to adapt the teaching of the invention to particular use, application, manufacturing conditions, use conditions, composition, medium, size, and/or materials without departing from the essential scope and spirit of the invention. Therefore it is intended that the invention not be limited to the particular embodiments and best mode contemplated for carrying out this invention as described herein.

The following clauses are set forth for reasons of completeness.

Clause 1. A method of making a polymer membrane, the method comprising: (a) providing a first monomer solution having a first solvent, a second monomer solution having a second solvent, and a substrate; and (b) electrospraying the first monomer solution onto a surface of the substrate and electrospraying the second monomer solution onto the substrate surface thereby forming the polymer membrane on at least a portion of the substrate surface, wherein the polymer membrane has a particular thickness and/or a particular smoothness.

Clause 2. The method of clause 1, wherein step (b) is repeated at least once, thereby adding one or more additional layers of polymer to the polymer membrane.

Clause 3. The method of clause 1 or clause 2, wherein step (b) is repeated from 3 to 9 times, such that the polymer membrane is formed from 4 to 10 layers of the polymer.

Clause 4. The method of any one of clauses 1-3, wherein the first monomer solution and/or the second monomer solution comprises a diamine, m-phenylene diamine (MPD), piperazine, an aromatic amine, an aliphatic amine, an acid chloride, trimesoyl chloride (TMC), polyvinyl alcohol, glutaraldehyde, or any combination thereof.

Clause 5. The method of any one of clauses 1-4, wherein the first monomer solution comprises MPD and the second monomer solution comprises TMC, wherein the MPD concentration ranges from about 0.0625 to about 0.5 wt/vol of the first solvent and the TMC concentration ranges from about 0.0375 to about 0.3 wt/vol of the second solvent.

Clause 6. The method of any one of clauses 1-5, wherein the first monomer solution comprises MPD and the second monomer solution comprises TMC, wherein the molar ratio of MPD:TMC ranges from 1:1 to 4:1.

Clause 7. The method of any one of clauses 1-6, wherein the first monomer solution and/or the second monomer solution further comprises a conductive spray aid.

Clause 8. The method of any one of clauses 1-7, wherein the smoothness of the polymer membrane as characterized by RMS roughness is controlled by the number of repetitions of step (b) and/or by the concentration of the first monomer solution and/or the concentration of the second monomer solution.

Clause 9. The method of any one of clauses 1-8, wherein the smoothness of the polymer membrane as characterized by RMS roughness is controllable to within less than about 35 nm.

Clause 10. The method of any one of clauses 1-9, wherein the thickness of the polymer membrane is controlled by the number of repetitions of step (b) and/or by the concentration of the first monomer solution and/or the concentration of the second monomer solution.

Clause 11. The method of any one of clauses 1-10, wherein the membrane thickness grows approximately linearly with the number of added layers.

Clause 12. The method of any one of clauses 1-11, wherein the membrane thickness is controllable to within less than or equal to about 4 nm.

Clause 13. The method of any one of clauses 1-12, wherein the substrate comprises polyvinylidene fluoride, nylon, polysulfone, polyethersulfone, polyacrylonitrile, polycarbonate, polybenzimidizole, cellulose, silica, siloxane, ceramic, glass, metal, a fibrous membrane, or any combination thereof.

Clause 14. The method of any one of clauses 1-13, wherein the thickness and/or smoothness of the polymer membrane is independent of the chemical identity of the substrate.

Clause 15. The method of any one of clauses 1-14, wherein the method further comprises electrospraying a nanoparticle solution in between the electrospraying of the first monomer solution and the electrospraying of the second monomer solution.

Clause 16. A polyamide film having a thickness of greater than or equal to 1 µm made by the method of any one of clauses 1-15.

Clause 17. A thin film composite membrane comprising a polymer, wherein the thin film composite membrane has a smoothness characterized by an RMS roughness value of less than or equal to about 45 nm.

Clause 18. The thin film composite membrane of clause 17, wherein the membrane consists essentially of 5 layers of the polymer, wherein the polymer is a polyamide polymer, wherein the membrane is approximately molecularly smooth as characterized by RMS roughness, wherein the membrane is attached to a porous substrate.

Clause 19. A desalination system comprising a thin film composite membrane attached to a porous substrate, the thin film composite membrane comprising a polymer, wherein the thin film composite membrane has a smoothness characterized by an RMS roughness value of less than or equal to about 45 nm.

Clause 20. The desalination system of clause 19, wherein the system demonstrates a pure water permeance in the range of about 0.1 LMH/bar to about 16 LMH/bar.

Various features and advantages of the invention are set forth in the following claims.

What is claimed is:

1. A method of making a polymer membrane, the method comprising:
   (a) providing a first monomer solution having a first solvent, a second monomer solution having a second solvent, and a substrate; and
   (b) electrospraying the first monomer solution onto a surface of the substrate and electrospraying the second monomer solution onto the substrate surface,
   wherein a polymerization reaction between the first monomer and the second monomer occurs, thereby forming the polymer membrane on at least a portion of the substrate surface,
   wherein the polymer membrane has a thickness and a smoothness, each of which is independently controlled.

2. The method of claim 1, wherein step (b) is repeated at least once, thereby adding one or more additional layers of polymer to the polymer membrane.

3. The method of claim 2, wherein the smoothness of the polymer membrane as characterized by RMS roughness is controlled by the number of repetitions of step (b) and/or by the concentration of the first monomer solution and/or the concentration of the second monomer solution.

4. The method of claim 3, wherein the smoothness of the polymer membrane as characterized by RMS roughness is controllable to within less than about 35 nm.

5. The method of claim 2, wherein the thickness of the polymer membrane is controlled by the number of repetitions of step (b) and/or by the concentration of the first monomer solution and/or the concentration of the second monomer solution.

6. The method of claim 5, wherein the membrane thickness grows approximately linearly with the number of added layers.

7. The method of claim 5, wherein the membrane thickness is controllable to within less than or equal to about 4 nm.

8. The method of claim 1, wherein step (b) is repeated from 3 to 9 times, such that the polymer membrane is formed from 4 to 10 layers of the polymer.

9. The method of claim 1, wherein the first monomer solution and/or the second monomer solution comprises a diamine, m-phenylene diamine (MPD), piperazine, an aromatic amine, an aliphatic amine, an acid chloride, trimesoyl chloride (TMC), polyvinyl alcohol, glutaraldehyde, or any combination thereof.

10. The method of claim 1, wherein the first monomer solution comprises MPD and the second monomer solution comprises TMC, wherein the MPD concentration ranges from about 0.0625 to about 0.5 wt/vol of the first solvent and the TMC concentration ranges from about 0.0375 to about 0.3 wt/vol of the second solvent.

11. The method of claim 1, wherein the first monomer solution comprises MPD and the second monomer solution comprises TMC, wherein the molar ratio of MPD:TMC ranges from 1:1 to 4:1.

12. The method of claim 1, wherein the first monomer solution and/or the second monomer solution further comprises a conductive spray aid.

13. The method of claim 1, wherein the substrate comprises polyvinylidene fluoride, nylon, polysulfone, polyethersulfone, polyacrylonitrile, polycarbonate, polybenzimidizole, cellulose, silica, siloxane, ceramic, glass, metal, a fibrous membrane, or any combination thereof.

14. The method of claim 1, wherein the thickness and/or smoothness of the polymer membrane is independent of the chemical identity of the substrate.

15. The method of claim 1, wherein the method further comprises electrospraying a nanoparticle solution in between the electrospraying of the first monomer solution and the electrospraying of the second monomer solution.

* * * * *